(12) United States Patent
Hirairi

(10) Patent No.: US 9,081,518 B2
(45) Date of Patent: Jul. 14, 2015

(54) INFORMATION PROCESSOR AND CONTROL METHOD OF THE SAME

(71) Applicant: Sony Corporation, Tokyo (JP)

(72) Inventor: Koji Hirairi, Kanagawa (JP)

(73) Assignee: Sony Corporation, Tokyo (JP)

( * ) Notice: Subject to any disclaimer, the term of this patent is extended or adjusted under 35 U.S.C. 154(b) by 232 days.

(21) Appl. No.: 13/713,382

(22) Filed: Dec. 13, 2012

(65) Prior Publication Data

US 2013/0185584 A1 Jul. 18, 2013

(30) Foreign Application Priority Data

Jan. 17, 2012 (JP) ................................ 2012-006979

(51) Int. Cl.
*G06F 1/12* (2006.01)
*G06F 1/32* (2006.01)

(52) U.S. Cl.
CPC ............... *G06F 1/12* (2013.01); *G06F 1/3203* (2013.01); *G06F 1/324* (2013.01); *Y02B 60/1217* (2013.01)

(58) Field of Classification Search
CPC ......... G06F 1/12; G06F 1/3203; G06F 1/324; Y02B 60/1217
See application file for complete search history.

(56) References Cited

U.S. PATENT DOCUMENTS

| 6,556,640 B1 * | 4/2003 | Baba ............................ 375/376 |
| 7,721,129 B2 * | 5/2010 | Kazachinsky et al. ........ 713/323 |
| 2006/0129860 A1 * | 6/2006 | Kazachinsky et al. ........ 713/323 |

FOREIGN PATENT DOCUMENTS

JP 2009-290775 12/2009

\* cited by examiner

*Primary Examiner* — M Elamin
(74) *Attorney, Agent, or Firm* — Fishman Stewart Yamaguchi PLLC

(57) ABSTRACT

Disclosed herein is an information processor including: a processing section adapted to perform a predetermined process on a data signal output in synchronism with one of positive and negative edges of a clock signal and output an execution result thereof; a holding section adapted to hold the execution result in synchronism with the other of the positive and negative edges; a timing determination section adapted to determine whether a grace period lasting until the execution result is held by the holding section meets a setup time of the holding section; a clock control section adapted, if it is determined that the grace period does not meet the setup time, to control at least the timing of either the positive or negative edge in such a manner that the grace period meets the setup time; and a clock generation section adapted to generate the clock signal according to the controlled timing.

12 Claims, 23 Drawing Sheets

FIG.6

| TOTAL PN ERROR COUNT E_PNtotal | TOTAL NP ERROR COUNT E_NPtotal | OPERATION OF CLOCK CONTROL SECTION | | |
|---|---|---|---|---|
| | | CLOCK PERIOD pCK | POSITIVE EDGE TIMING tR | NEGATIVE EDGE TIMING tF |
| E_PNtotal< THRESHOLD | E_NPtotal< THRESHOLD | 10 | 0 | 5 |
| E_PNtotal≧ THRESHOLD | E_NPtotal< THRESHOLD | 10 | 0 | 7 |
| E_PNtotal< THRESHOLD | E_NPtotal≧ THRESHOLD | 10 | 2 | 5 |
| E_PNtotal≧ THRESHOLD | E_NPtotal≧ THRESHOLD | 14 | 0 | 7 |

FIG. 8

| RESET SIGNAL RST | COMPARISON RESULT BETWEEN COUNT VALUE cCNT AND tR, tF AND pCK | CLOCK SIGNAL VALUE VAL | COUNTER RESET SIGNAL cRST |
|---|---|---|---|
| 1 | — | 0 | 1 |
| 0 | cCNT<tR | 0 | 0 |
| 0 | tR≦cCNT<tF | 1 | 0 |
| 0 | tF≦cCNT<pCK | 0 | 0 |
| 0 | cCNT=pCK | 0 | 1 |

FIG.18

| TOTAL PN ERROR COUNT E_PNtotal | TOTAL NP ERROR COUNT E_NPtotal | COUNT VALUE vCNT | OPERATION OF VOLTAGE CONTROL SECTION |
|---|---|---|---|
| E_PNtotal< THRESHOLD | E_NPtotal< THRESHOLD | vCNT< SET PERIOD | vCNT←vCNT+1 |
| | | vCNT= SET PERIOD | ΔV←SETTING TO REDUCE VOLTAGE CNT←0 |
| E_PNtotal≥ THRESHOLD | E_NPtotal< THRESHOLD | — | ΔV←SETTING TO INCREASE VOLTAGE CNT←0 |
| E_PNtotal< THRESHOLD | E_NPtotal≥ THRESHOLD | — | ΔV←SETTING TO INCREASE VOLTAGE CNT←0 |
| E_PNtotal≥ THRESHOLD | E_NPtotal≥ THRESHOLD | — | ΔV←SETTING TO INCREASE VOLTAGE CNT←0 |

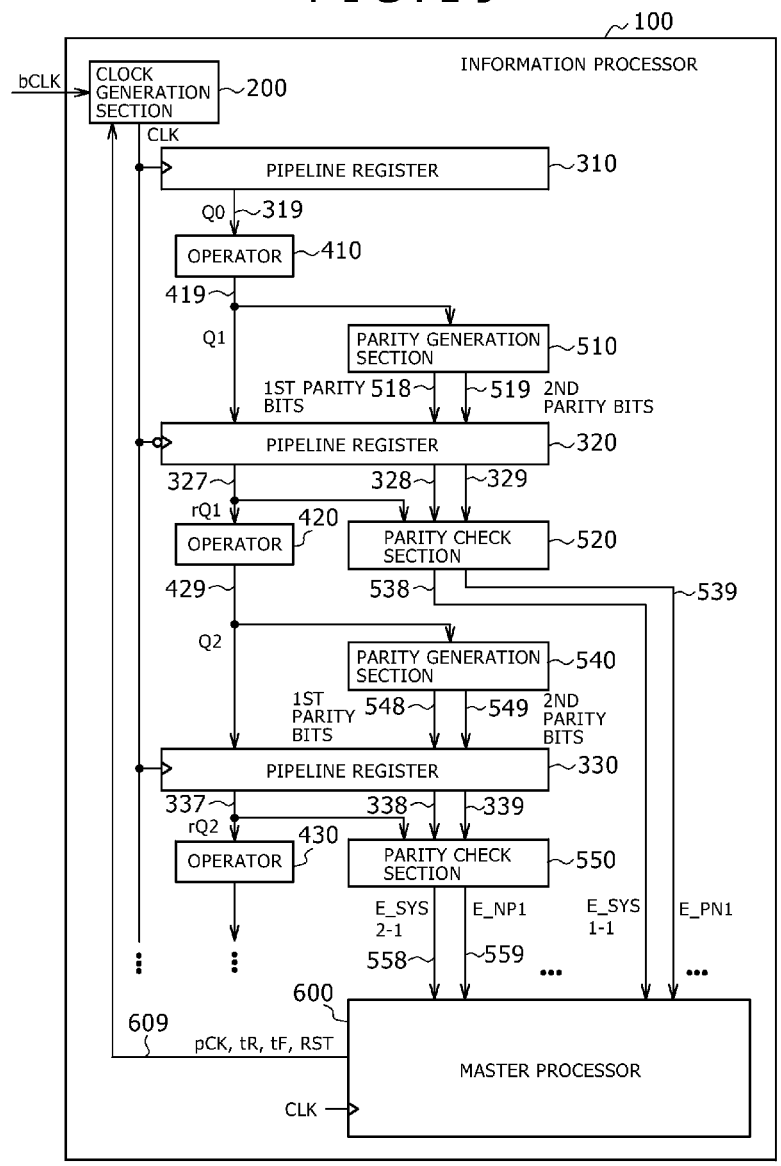

FIG.23

| TOTAL SYSTEM ERROR COUNT E_SYStotal DETECTED BY 1ST PARITY BITS | TOTAL PN ERROR COUNT E_PNtotal DETECTED BY 2ND PARITY BITS | TOTAL NP ERROR COUNT E_NPtotal DETECTED BY 2ND PARITY BITS | OPERATION OF CLOCK CONTROL SECTION | | | |
|---|---|---|---|---|---|---|
| | | | pCK | tR | tF | RST |
| E_SYStotal ≧ THRESHOLD | — | — | 0 | 0 | 0 | 1 |
| E_SYStotal < THRESHOLD | E_PNtotal < THRESHOLD | E_NPtotal < THRESHOLD | 10 | 0 | 5 | 0 |
| | E_PNtotal ≧ THRESHOLD | E_NPtotal < THRESHOLD | 10 | 0 | 7 | |
| | E_PNtotal < THRESHOLD | E_NPtotal ≧ THRESHOLD | 10 | 2 | 5 | |
| | E_PNtotal ≧ THRESHOLD | E_NPtotal ≧ THRESHOLD | 14 | 0 | 7 | |

INFORMATION PROCESSOR AND CONTROL METHOD OF THE SAME

BACKGROUND

The present technology relates to an information processor and control method of the same, and more particularly, to an information processor adapted to operate in synchronism with a clock signal and control method of the same.

A circuit adapted to operate in synchronism with a clock signal has a storage element and processing circuit. The storage element is, for example, a register that holds and outputs a data signal in synchronism with the clock signal. The processing circuit includes a combinational logic circuit adapted to perform logic operations or the like on the output data signal. If the output of an execution result from the processing circuit is synchronized with the clock signal in such a circuit, a retiming circuit may be further provided to adjust the output timing. For example, a retiming circuit has been proposed that includes a flip-flop adapted to hold and output an input signal in synchronism with a clock signal (refer to Japanese Patent Laid-Open No. 2009-290775).

Such a retiming circuit may hold the execution result of an operation on a data signal at a timing (e.g., negative edge) different from a timing (e.g., positive edge) at which the data signal is output to the processing circuit. Delaying the timing at which to hold the execution result from the timing at which to output the data signal to the processing circuit makes the execution result be held unfailingly, thereby suppressing the occurrences of timing errors in the retiming circuit.

SUMMARY

However, it may be difficult for the above related art to suppress the occurrences of timing errors. For example, the execution time of the processing circuit may become longer due, for example, to a voltage drop of the processing circuit. If the execution time becomes longer, the output of the execution result is delayed. As a result, a grace period lasting until the execution result is held by the retiming circuit may not meet a setup time of the retiming circuit. Here, the term "setup time" refers to a period of time during which an output circuit (e.g., processing circuit) should continue to output a data signal ahead of the timing at which the retiming circuit or other circuit is instructed to load the data. If the grace period does not meet the setup time, the retiming circuit will fail in holding the execution result, thus resulting in a timing error.

The present technology has been devised in light of the foregoing, and it is desirable to suppress the occurrences of a timing error in a circuit adapted to operate in synchronism with a clock signal.

According to a first mode of the present technology, there is provided an information processor and control method of the same. The information processor includes a processing section, holding section, timing determination section, clock control section and clock generation section. The processing section performs a predetermined process on a data signal output in synchronism with one of positive and negative edges of a clock signal and outputs an execution result thereof. The holding section holds the execution result in synchronism with the other of the positive and negative edges. The timing determination section determines whether a grace period lasting until the execution result is held by the holding section meets a setup time of the holding section. The clock control section controls at least the timing of either the positive or negative edge in such a manner that the grace period meets the setup time if it is determined that the grace period does not meet the setup time. The clock generation section generates the clock signal according to the controlled timing. This provides an advantageous effect in that at least the timing of either the positive or negative edge is controlled in such a manner that the grace period meets the setup time.

Further, in the first mode, the timing determination section determines whether each of two grace periods, namely, a negative edge grace period which is a grace period lasting until the execution result related to the data signal output in synchronism with the positive edge is held by the holding section in synchronism with the negative edge, and a positive edge grace period which is a grace period lasting until the execution result related to the data signal output in synchronism with the negative edge is held by the holding section in synchronism with the positive edge, meets the setup time. The clock control section may include a timing control section and clock period control section. The timing control section controls the timing of at least the positive or negative edge in such a manner that both the negative and positive edge grace periods meet the setup time if it is determined that the negative or positive edge grace period does not meet the setup time. The clock period control section prolongs the period of the clock signal in such a manner that both the negative and positive edge grace periods meet the setup time if it is determined that both the negative and positive edge grace periods do not meet the setup time. This provides an advantageous effect in that the period of the clock signal is prolonged in such a manner that both the negative and positive edge grace periods meet the setup time.

Still further, in the first mode, the clock control section may perform at least one of two control tasks until the grace period meets the setup time, namely, one adapted to hasten one of the timings, and another adapted to delay the other timing. This provides an advantageous effect in that at least one of two control tasks is performed until the grace period meets the setup time, namely, one adapted to hasten one of the timings, and another adapted to delay the other timing.

Still further, in the first mode, the information processor may further include a delay section adapted to delay the execution result output from the processing section before outputting the same result to the holding section. The timing determination section treats the period lasting until the execution result delayed by the delay section is held by the holding section as the grace period and determines whether the grace period meets the setup time of the holding section. This provides an advantageous effect in that it is determined whether the grace period lasting until the delayed execution result is held by the holding section meets the setup time of the holding section.

Still further, in the first mode, the information processor may still further include an error code generation section adapted to generate an error detection code used to detect an error in the execution result delayed by the delay section. The timing determination section determines that the grace period does not meet the setup time if an error of the delayed execution result is detected by using the error detection code. This provides an advantageous effect in that it is determined that the grace period does not meet the setup time if an error of the execution result is detected by using the error detection code.

Still further, in the first mode, the processing section may still further include a voltage control section adapted to perform the predetermined process on the data signal in an execution time commensurate with a voltage supplied from a power supply section and cause the power supply section to supply a voltage increased by a predetermined level if it is determined that the grace period does not meet the setup time. This provides an advantageous effect in that the voltage increased by the predetermined level is supplied to the holding section if the grace period does not meet the setup time.

The present technology provides an advantageous effect in that occurrences of a timing error are suppressed in a circuit adapted to operate in synchronism with a clock signal.

BRIEF DESCRIPTION OF THE DRAWINGS

FIG. 6 is a table illustrating an example of operation of a clock control section according to the first embodiment;

FIG. 8 is a table illustrating an example of operation of a clock generation circuit according to the first embodiment;

FIG. 18 is a table illustrating an example of operation of a voltage control section according to the second embodiment;

FIG. 19 is a block diagram illustrating a configuration example of the information processor according to a third embodiment;

FIG. 23 is a table illustrating an example of operation of the clock control section according to the third embodiment.

DETAILED DESCRIPTION OF THE PREFERRED EMBODIMENTS

A description will be given below of the modes for carrying out the present technology (hereinafter referred to as the embodiments). The description will be given in the following order.

1. First embodiment (example in which the edge timings are controlled when errors occur frequently)
2. Second embodiment (example in which the edge timings and voltage are controlled when errors occur frequently)
3. Third embodiment (example in which the edge timings are controlled when errors occur frequently with a shorter grace period)

1. First Embodiment

Configuration Example of the Information Processor

Figure 1:
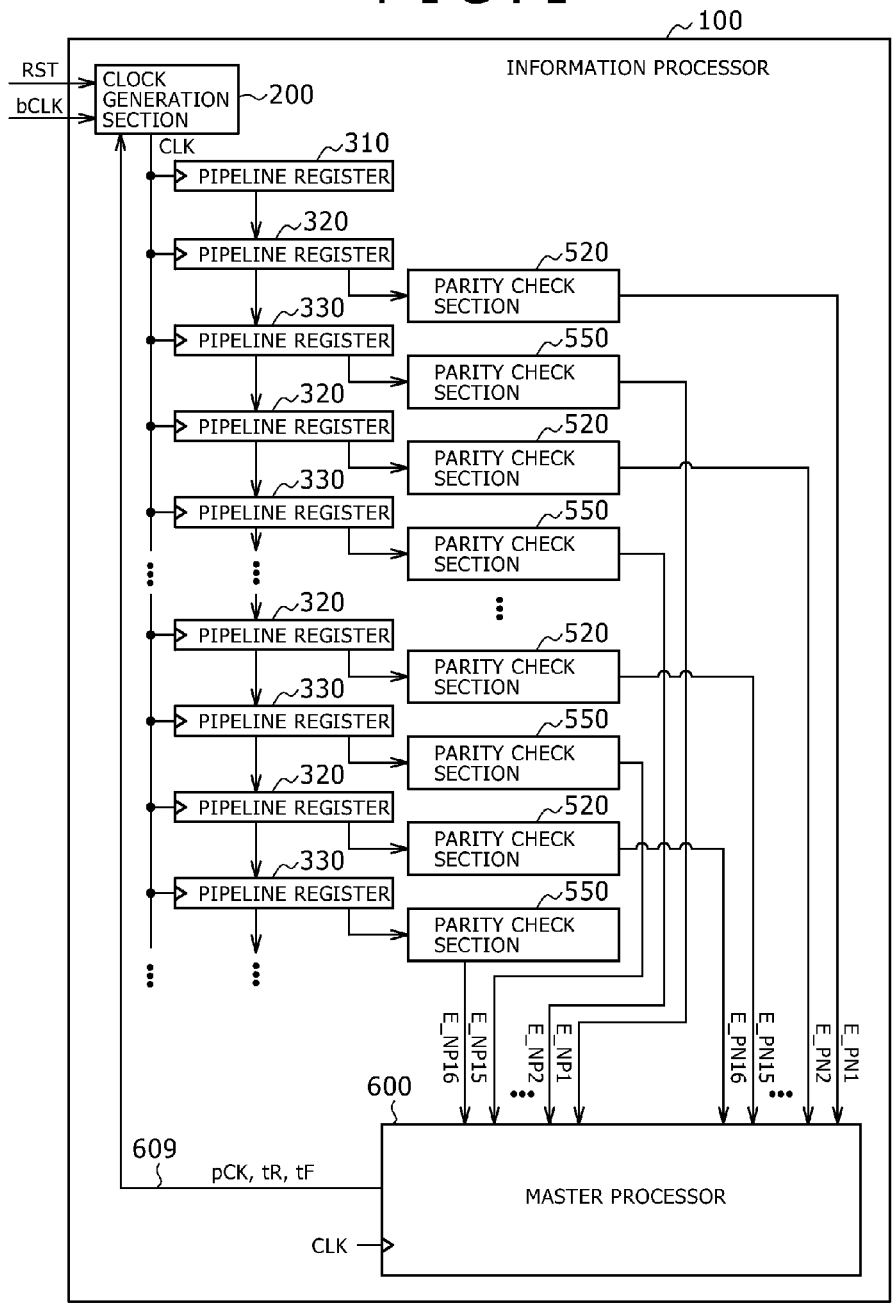
FIG. 1 is an overall diagram illustrating a configuration example of an information processor according to a first embodiment.

FIG. 1 is an overall diagram illustrating a configuration example of an information processor 100 according to a first embodiment. The information processor 100 performs various information processing tasks and includes a clock generation section 200 and master processor 600. Further, the information processor 100 includes a plurality of stages of pipeline registers, and parity check sections 520 and 550. Of these pipeline registers, a pipeline register 310 at the first stage supplies data to be processed. Each of pipeline registers 320 at the plurality of stages (e.g., 16 stages) from the second stage onward holds the execution result at a predetermined stage of the pipeline processing. The pipeline registers 310 and 320 operate, for example, in synchronism with a positive edge of a clock signal. A pipeline register 330 is inserted for adjusting a timing between the stages of the pipeline registers (310 and 320) adapted to operate in synchronism with a positive edge of a clock signal. The pipeline register 330 is adapted to operate, for example, in synchronism with a negative edge of a clock signal. If there are 16 stages of the pipeline registers 320, 16 stages of the pipeline registers 330 are inserted.

The clock generation section 200 generates a clock signal CLK from a reference clock signal bCLK according to a clock period pCK, positive edge timing tR and negative edge timing tF controlled by the master processor 600. The same section 200 divides the frequency of the reference clock signal bCLK and outputs the frequency-divided signal as the clock signal CLK. The frequency division ratio used for frequency division is the ratio of a frequency ($f_L$) related to the clock period pCK to a frequency ($f_H$) of the reference clock signal bCLK, namely, the ratio ($f_L/f_H$). Further, the clock generation section 200 adjusts the edge timing of the clock signal CLK according to the positive edge timing tR and negative edge timing tF. The same section 200 outputs the frequency-divided signal to the pipeline registers (310, 320, 330 and so on) and the master processor 600 as the clock signal CLK. Still further, the same section 200 stops the generation and the output of the clock signal CLK when supplied with a reset signal RST.

The pipeline register 310 holds data to be processed and outputs the data to the pipeline resister 320 in synchronism with a positive edge of the clock signal CLK. Data to be held by the same register 310 includes 16-bit data.

Each of the pipeline registers 320 and 330 holds and outputs the execution result at a predetermined stage of the pipeline processing in synchronism with the clock signal CLK. Further, each of the pipeline registers 320 and 330 holds, in addition to the execution result, parity bits adapted to detect an error in the execution result. The execution result held by each of the pipeline registers 320 and 330 includes, for example, 16-bit data. Each of the pipeline registers 320 operates in synchronism with a positive edge of the clock signal CLK and is provided at an even-numbered stage. Each of the pipeline registers 330 operates in synchronism with a negative edge of the clock signal CLK and is provided at an odd-numbered stage. A parity bit generation section adapted to generate parity bits and an operator adapted to perform a predetermined operation are provided between the pipeline registers 320 and so on. These components are not shown in FIG. 1. A detailed description will be given later of the configuration of each of the parity bit generation sections and operators.

Each of the parity check sections 520 detects an error in the data held by one of the pipeline registers 320 at the even-numbered stages using the parity bits held by the same register 320. The parity check section 520 outputs the detection result to the master processor 600. One of the parity check sections 520 is provided for each of the pipeline registers 320 at the even-numbered stages. The parity check sections 520 output the parity error detection results to the master processor 600 as error information E_PN1 to E_PN16.

Each of the parity check sections 550 detects an error in the data held by one of the pipeline registers 330 at the odd-numbered stages using the parity bits held by the same register 330. The parity check section 550 outputs the detection result to the master processor 600. One of the parity check sections 550 is provided for each of the pipeline registers 330 at the odd-numbered stages. The parity check sections 550 output the parity error detection results to the master processor 600 as error information E_NP1 to E_NP16.

The master processor 600 controls the clock period pCK, positive edge timing tR and negative edge timing tF based on the error detection results. A detailed description will be given later of the nature of control exercised by the master processor 600.

Figure 2:
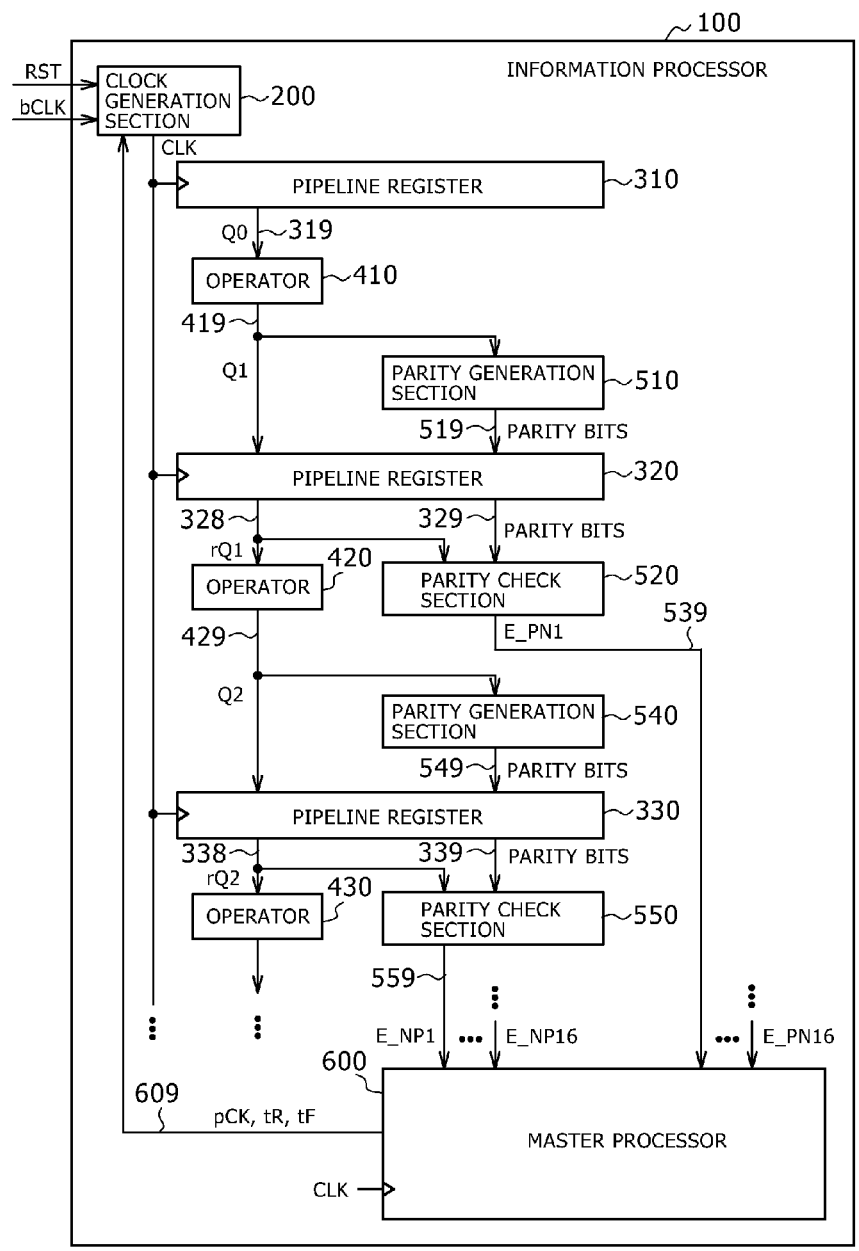
FIG. 2 is a block diagram illustrating a configuration example of the information processor according to the first embodiment.

FIG. 2 is a block diagram illustrating a configuration example of the information processor 100 according to the first embodiment. As illustrated in FIG. 2, parity generation sections 510 and 540 and operators 410, 420 and 430 are provided in the information processor 100.

The pipeline register 310 at the first stage holds data and outputs the data to the operator 410 via a signal line 319 in synchronism with a positive edge of the clock signal CLK.

Each of the pipeline registers 320 at the even-numbered stages holds and outputs the execution result and parity bits in synchronism with a negative edge of the clock signal CLK. The same register 320 holds, for example, the execution result including 16-bit data, and 4-bit parity bits. The pipeline register 320 outputs the data to the operator 420 and parity check section 520 via a signal line 328 and the parity bits to the parity check section 520 via a signal line 329.

Each of the pipeline registers 330 at the odd-numbered stages from the third stage onward holds and outputs the execution result and parity bits in synchronism with a positive edge of the clock signal CLK. The same register 330 holds, for example, the execution result including 16-bit data, and 4-bit parity bits. The pipeline register 330 outputs the data to the operator 430 and parity check section 550 via a signal line 338 and the parity bits to the parity check section 550 via a signal line 329. Each of the pipeline registers 320 and 330 is an example of the holding section as defined in the appended claims.

The operator 410 performs a predetermined operation on the data output from the pipeline register 310 at the first stage. The operator 410 outputs the operation execution result to the parity generation section 510 and pipeline register 320 via a signal line 419. The execution result includes, for example, 16-bit data. The operator 420 performs a predetermined operation on the data output from one of the pipeline registers 320 at the even-numbered stages. The operator 430 performs a predetermined operation on the data output from one of the pipeline registers 330 at the odd-numbered stages from the third stage onward. It should be noted that each of the operators 410, 420 and 430 is an example of the processing section as defined in the appended claims.

The parity generation section 510 generates parity bits from the execution result output from the operator 410. The same section 510 generates 4-bit parity bits, for example, by XORing (exclusive ORing) each of four O-bit strings making up 16-bit data. The parity generation section 510 outputs the generated parity bits to the pipeline register 320 via a signal line 519. The parity generation sections other than the parity generation section 510 are identical in configuration to the parity generation section 510.

Each of the parity check sections 520 detects an error in the data held by the pipeline register 320 using the parity bits held by the same register 320. The same section 520 generates 4-bit parity bits, for example, by XORing (exclusive ORing) each of four 4-bit strings making up 16-bit data. Then, the parity check section 520 compares the generated parity bits and those held by the pipeline register 320, thus generating 1-bit information indicating the result of ORing (logical sum operation) of the comparison results of each of the bits as an error detection result. The same section 520 outputs the detection result to the master processor 600 via a signal line 539.

Here, if the grace period lasting until the execution result from the operator 410 is held by the pipeline register 320 does not meet the setup time of the same register 320, an error is detected by the parity check section 520. In other words, the error is detected if the execution result of operation on a data signal output in synchronism with a positive edge is not held at a negative edge. Such an error will be hereinafter referred to as a "PN error." The 16 parity check sections 520 output the PN error information E_PN1 to E_PN16 as the detection results.

Each of the parity check sections 550 detects an error in the data held by the pipeline register 330 using the parity bits held by the same register 330. The parity check section 550 is identical in configuration to the parity check sections 520. The same section 550 outputs the error detection result to the master processor 600 via a signal line 559.

Here, if the grace period lasting until the execution result from the operator 420 is held by the pipeline register 330 does not meet the setup time of the same register 330, an error is detected by the parity check section 550. In other words, the error is detected if the execution result of operation on a data signal output in synchronism with a negative edge is not held at a positive edge. Such an error will be hereinafter referred to as an "NP error." The 16 parity check sections 550 output NP error information E_NP1 to E_NP16 as the detection results. It should be noted that each of the parity check sections 520 and 550 is an example of the timing determination section as defined in the appended claims.

The master processor 600 controls the edge timings in such a manner that the grace period meets the setup time if a PN or NP error is detected (that is, the grace period does not meet the setup time).

More specifically, in the event of detection of a PN error, the master processor 600 performs at least one of two control tasks, i.e., one adapted to hasten the positive edge timing tR and another adapted to delay the negative edge timing tF. This control provides a higher duty ratio of the clock signal CLK. As a result, the grace period lasting until the execution result of operation on the data signal output in synchronism with a positive edge is held at a negative edge is prolonged, thus ensuring that the grace period meets the setup time. This provides reduced frequency of occurrence of a PN error.

In the event of detection of an NP error, on the other hand, the master processor 600 performs at least one of two control tasks, i.e., one adapted to delay the positive edge timing tR and another adapted to hasten the negative edge timing tF. This control provides a lower duty ratio of the clock signal CLK. As a result, the grace period lasting until the execution result of operation on the data signal output in synchronism with a negative edge is held at a positive edge is prolonged, thus ensuring that the grace period meets the setup time. This provides reduced frequency of occurrence of an NP error.

Here, in the event of detection of both PN and NP errors, it is difficult to reduce the frequencies of occurrence of these two errors by controlling the edge timings. The reason for this is that it is necessary to increase the duty ratio to reduce the frequency of occurrence of a PN error whereas it is necessary to reduce the duty ratio to reduce the frequency of occurrence of an NP error. In the event of detection of both PN and NP errors therefore, the master processor 600 prolongs the clock period pCK. If the clock period pCK is prolonged, the grace period lasting until the execution result is held in synchronism with a negative edge and grace period lasting until the execution result is held in synchronism with a positive edge are both prolonged. This ensures that both of the grace periods meet the setup time, thus providing reduced frequencies of occurrence of PN and NP errors.

It should be noted that the master processor 600 is an example of the clock control section as defined in the appended claims. On the other hand, although performing parity check, the information processor 100 may perform other process if capable of determining whether or not the grace periods meet the setup time. For example, the same processor 100 may detect an error by using a check sum or hash function to determine whether or not the grace periods meet the setup time.

[Configuration Example of the Parity Generation Section]

Figure 3:
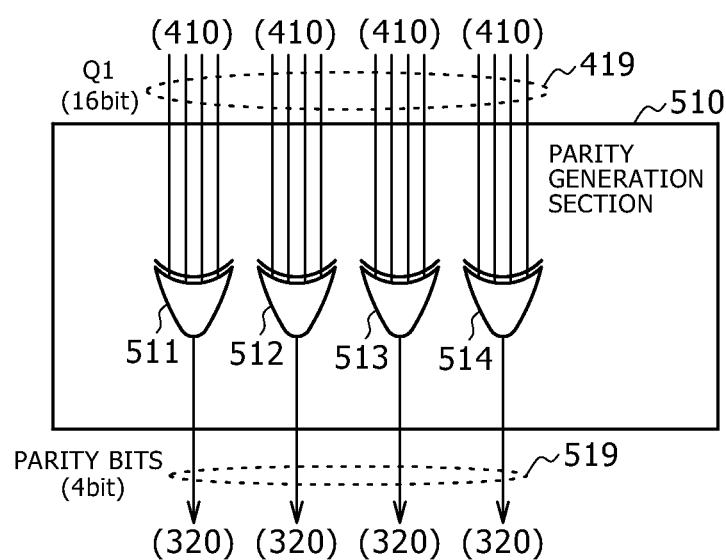
FIG. 3 is a block diagram illustrating a configuration example of a parity generation section according to the first embodiment.

FIG. 3 is a block diagram illustrating a configuration example of the parity generation section 510 according to the first embodiment. The same section 510 includes XOR gates 511 to 514.

Each of the XOR gates 511 to 514 outputs the exclusive logical sum of the input values. The 16-bit data output from the operators 410 is divided into four groups, each made up of a 4-bit bit string. Each of the XOR gates 511 to 514 is supplied with a bit string belonging to a different group. Each of the XOR gates 511 to 514 outputs the exclusive logical sum of the supplied bit string to the pipeline register 320 as a parity bit.

[Configuration Example of the Parity Check Section]

Figure 4:
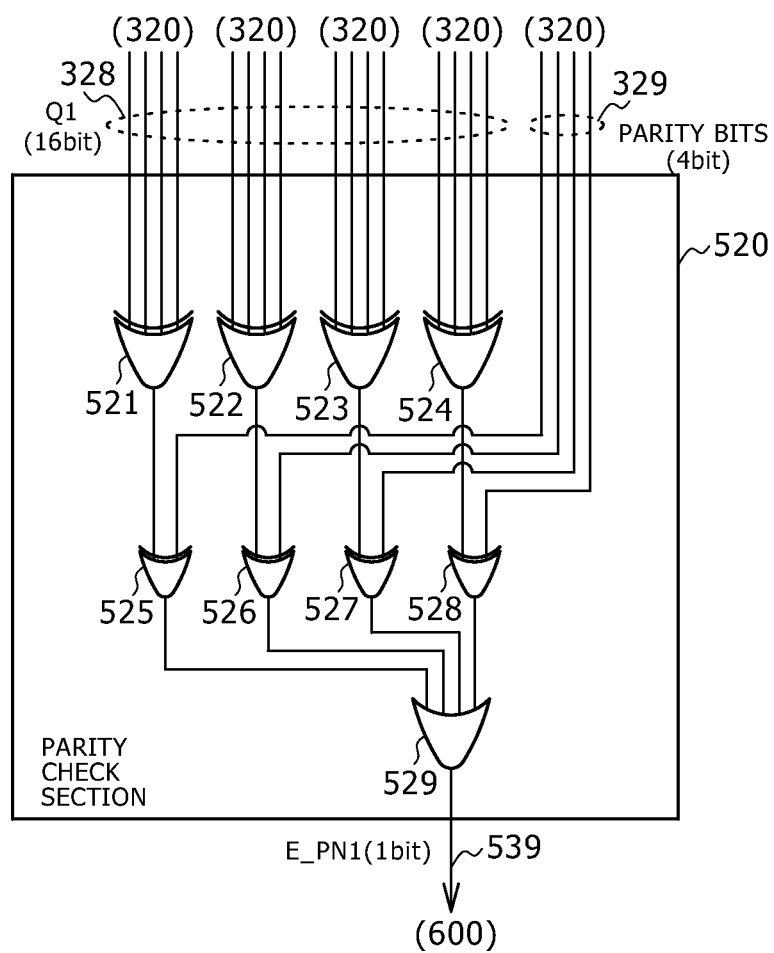
FIG. 4 is a block diagram illustrating a configuration example of a parity check section according to the first embodiment.

FIG. 4 is a block diagram illustrating a configuration example of the parity check section 520 according to the first embodiment. The same section 520 includes XOR gates 521 to 528 and an OR gate 529.

Each of the XOR gates 521 to 528 outputs the exclusive logical sum of the input values. Each of the XOR gates 521 to 524 is supplied with a bit string belonging to a different group. The same gates 521 to 524 output the exclusive logical sums of the input values to the XOR gates 525 to 528, respectively. Each of these exclusive logical sums is an even parity bit which becomes "0" when, of the four bits belonging to the related group, the number of those which are "1" is even.

Each of the XOR gates 525 to 528 is supplied with two parity bits: one is supplied from one of the XOR gates 521 to 524 and is different from each other, and another is supplied from the pipeline register 320. The same gates 525 to 528 output the exclusive logical sums of these input values to the OR gate 529 as error information. Each of these pieces of error information is 1-bit information which becomes "1" when a parity error is detected in the bit string belonging to the related group and "0" when no parity error is detected.

The OR gate 529 outputs the logical sum of the input values. The same gate 529 outputs the logical sum of the pieces of error information from the XOR gates 525 to 528 to the master processor 600 as the PN error information E_PN1.

[Configuration Example of the Master Processor]

Figure 5:
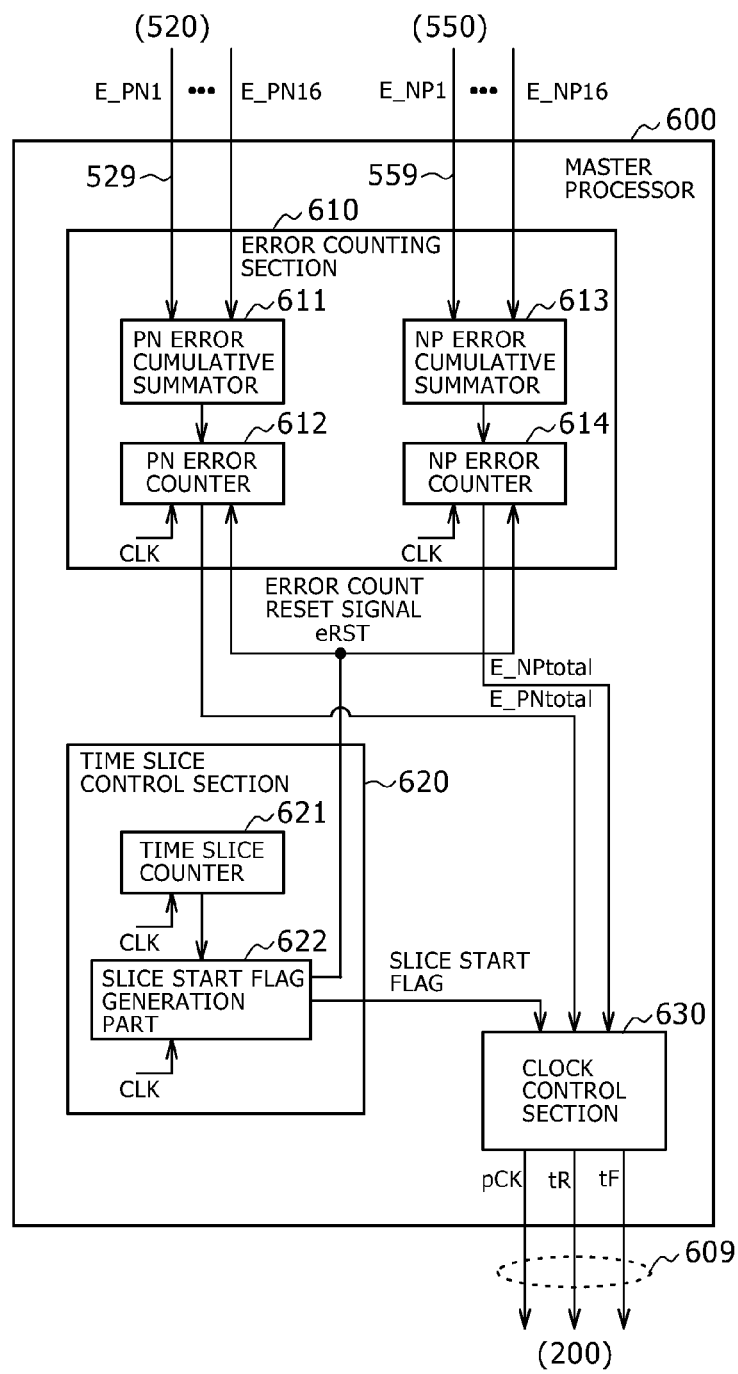
FIG. 5 is a block diagram illustrating a configuration example of a master processor according to the first embodiment.

FIG. 5 is a block diagram illustrating a configuration example of the master processor 600 according to the first embodiment. The same processor 600 includes an error counting section 610, time slice control section 620 and clock control section 630.

The error counting section 610 counts the number of errors detected within a predetermined counting period. This counting period will be hereinafter referred to as a "time slice." A time slice is set to be longer than the period of the clock signal CLK. For example, a time slice is set to be 129 times as long as the period of the clock signal CLK (that is, 129 clock cycles). The error counting section 610 includes a PN error cumulative summator 611, PN error counter 612, NP error cumulative summator 613 and NP error counter 614.

The PN error cumulative summator 611 calculates the total sum of PN errors detected within a clock period. The same summator 611 is supplied with a 16-bit bit string made up of the PN error information E_PN1 to E_PN16. The PN error cumulative summator 611 calculates the number of bits which are "1" (that is, the total sum of PN errors) in the bit string. The same summator 611 outputs the calculated total sum to the PN error counter 612.

The NP error cumulative summator 613 calculates the total sum of NP errors detected within a clock period. The same summator 613 is supplied with a 16-bit bit string made up of the NP error information E_NP1 to E_NP16. The NP error cumulative summator 613 calculates the number of bits which are "1" in the bit string and outputs the bit count to the NP error counter 614.

The PN error counter 612 counts the number of PN errors detected within a time slice. The same counter 612 adds the total sum from the PN error cumulative summator 611 to the count value in synchronism with the clock signal CLK. The PN error counter 612 outputs the count value to the clock control section 630 as a total PN error count $E\_PN_{total}$. Further, the same counter 612 resets the count value to its initial value (e.g., "0") when supplied with an error count reset signal eRST.

The NP error counter 614 counts the number of NP errors detected within a time slice. The same counter 614 adds the total sum from the NP error cumulative summator 613 to the count value in synchronism with the clock signal CLK. The NP error counter 614 outputs the count value to the clock control section 630 as a total NP error count $E\_NP^{total}$. Further, the same counter 614 resets the count value to its initial value (e.g., "0") when supplied with the error count reset signal eRST.

The time slice control section 620 specifies the timing at which to control the clock signal CLK within a time slice. The same section 620 includes a time slice counter 621 and slice start flag generation part 622.

The time slice counter 621 counts the elapsed time within a time slice. The same counter 621, for example, decrements the count value by 1 each time a clock period of the clock signal CLK elapses. The time slice counter 621 resets the count value to its initial value (e.g., "128" in decimal) in the clock period next to that in which the count value becomes "0."

The slice start flag generation part 622 generates a slice start flag and the error count reset signal eRST based on the count value of the time slice counter 621. The slice start flag is a signal adapted to instruct the output of the clock signal period and the amount by which the edge timings are to be controlled at a predetermined timing within a time slice. The slice start flag generation part 622 generates a slice start flag and outputs the flag to the clock control section 630, for example, when the value of the time slice counter 621 is "126." Then, the same section 622 outputs the error count reset signal eRST to the error counting section 610 in the clock period following that in which the slice start flag was output.

The clock control section 630 controls the period of the clock signal CLK and the edge timings based on the number of errors. When supplied with a slice start flag, the same section 630 refers to the total PN error count $E\_PN_{total}$ and total NP error count $E\_NP_{total}$. If both of these counts are smaller than a predetermined threshold, the clock control section 630 controls the clock period pCK, positive edge timing tR and negative edge timing tF to their initial values.

Here, the clock period pCK is set, for example, to the multiplication factor (in other words, the reciprocal of the frequency division ratio) by which the period of the reference clock signal bCLK is multiplied. For example, if the frequency division ratio is controlled to "1/10," the clock period pCK is set to the value "10" in decimal. Further, the positive edge timing tR and negative edge timing tF are set respectively to the values obtained by dividing the elapsed times from the start of the period of the clock signal CLK to the positive or negative edge timings by the period of the reference clock signal bCLK. For example, if the negative edge timing is set to the point in time at which five clocks of the reference clock signal bCLK elapse from the start of the period of the clock signal CLK, the negative edge timing tF is set to the value "5" in decimal.

If the total PN error count $E\_PN_{total}$ is equal to or larger than the threshold, and if the total NP error count $E\_NP_{total}$ is smaller than the threshold, the clock control section 630 exercises control in such a manner as to reduce the frequency of occurrence of a PN error. More specifically, the same section 630 performs at least one of two control tasks, i.e., one adapted to hasten the positive edge timing tR and another adapted to delay the negative edge timing tF.

If the total PN error count $E\_PN_{total}$ is smaller than the threshold, and if the total NP error count $E\_NP_{total}$ is equal to or larger than the threshold, the clock control section 630 exercises control in such a manner as to reduce the frequency of occurrence of an NP error. More specifically, the same section 630 performs at least one of two control tasks, i.e., one adapted to hasten the negative edge timing tF and another adapted to delay the positive edge timing tR.

If both the total PN error count $E\_PN_{total}$ and total NP error count $E\_NP_{total}$ are equal to or larger than the threshold, the clock control section 630 exercises control in such a manner as to prolong the clock period pCK.

It should be noted that although the same value is used as the threshold for the total PN error count $E\_PN_{total}$ and total NP error count $E\_NP_{total}$, different values may be used as the thresholds for these counts. These thresholds are set to appropriate values commensurate with the number of parity check sections adapted to detect errors and the specification of the pipeline registers. For example, if the number of parity check sections adapted to detect PN errors is larger than that of parity check sections adapted to detect NP errors, it is only necessary to set the threshold for the total PN error count $E\_PN_{total}$ to a value larger than that for the total NP error count $E\_NP_{total}$.

FIG. 6 is a table illustrating an example of operation of the clock control section 630 according to the first embodiment. When the slice start flag is supplied, the clock control section 630 refers the total PN error count $E\_PN_{total}$ and total NP error count $E\_NP_{total}$. If both the total PN error count $E\_PN_{total}$ and total NP error count $E\_NP_{total}$ are smaller than the threshold, the clock control section 630 controls the clock period pCK, positive edge timing tR and negative edge timing tF to their initial values. The initial value of the clock period pCK is, for example "10," and those of the positive edge timing tR and negative edge timing tF are, for example, "0" and "5," respectively.

If only the total PN error count $E\_PN_{total}$ is equal to or larger than the threshold, the clock control section 630 controls, for example, the positive edge timing tR to "0" and the negative edge timing tF to "7." Further, the clock period pCK is controlled to "10."

If only the total NP error count $E\_NP_{total}$ is equal to or larger than the threshold, the clock control section 630 controls, for example, the positive edge timing tR to "2" and the negative edge timing tF to "5." Further, the clock period pCK is controlled to "10."

If both the total PN error count $E\_PN_{total}$ and total NP error count $E\_NP_{total}$ are larger than the threshold, the clock control section 630 changes the clock period pCK to "14." Further, it is preferred that the duty ratio should remain the same before and after the clock period pCK is changed. Therefore, the same section 630 controls, for example, the positive edge timing tR to "0" and the negative edge timing tF to "7."

[Configuration Example of the Clock Generation Section]

Figure 7:
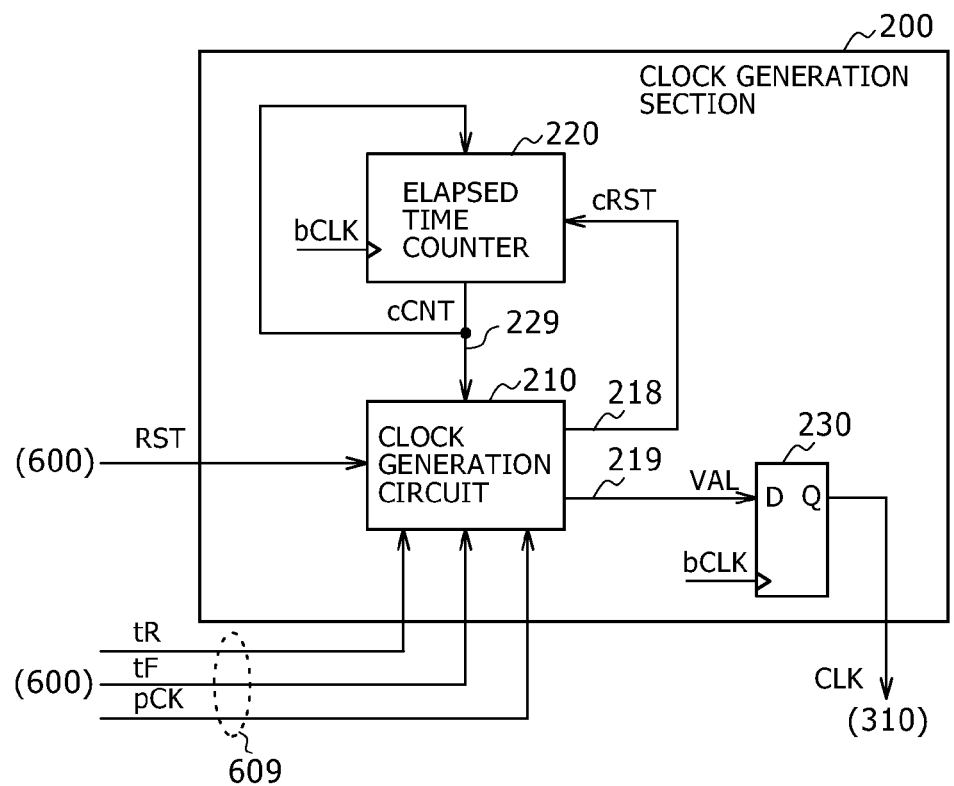
FIG. 7 is a block diagram illustrating a configuration example of a clock generation section according to the first embodiment.

FIG. 7 is a block diagram illustrating a configuration example of the clock generation section 200 according to the first embodiment. The same section 200 includes a clock generation circuit 210, elapsed time counter 220 and register 230.

The elapsed time counter 220 performs counting in synchronism with the reference clock signal bCLK. The same counter 220 outputs the counted number as a count value cCNT to the clock generation circuit 210 via a signal line 229 and feeds this number back to itself. Further, when supplied with a counter reset signal cRST adapted to instruct the initialization of the count value, the elapsed time counter 220 resets the count value cCNT.

The clock generation circuit 210 generates a signal value of the clock signal CLK. The same circuit 210 is supplied with the positive edge timing tR, negative edge timing tF, clock period pCK, reset signal RST and count value cCNT. The clock generation circuit 210 compares the count value cCNT against the positive edge timing tR, negative edge timing tF and clock period pCK. If the count value cCNT is equal to or larger than the positive edge timing tR and smaller than the negative edge timing tF, the same circuit 210 outputs the value "1" to the register 230 through a signal line 219 as a clock signal value VAL. The same circuit 210 outputs the value "0" to the register 230 as the clock signal value VAL in all other cases.

Further, if the count value cCNT matches the clock period pCK, the clock generation circuit 210 outputs the counter reset signal cRST to the elapsed time counter 220 via a signal line 218. When supplied with the reset signal RST, the same circuit 210 outputs the value "0" to the register 230 as the clock signal value VAL and the counter reset signal cRST to the elapsed time counter 220.

As described above, because the count value counted in synchronism with the reference clock signal bCLK is initialized at intervals of the clock period pCK, the clock signal CLK generated by the clock period pCK is a signal obtained by dividing the frequency of the reference clock signal bCLK.

It should be noted that although the clock generation section 200 changes, under control of the master processor 600, the period and timing of the clock signal CLK using the elapsed time counter 220, the configuration of the same section 200 is not limited to that shown in FIG. 7. For example, a phase comparator may be used to change the timing. A PLL (Phased Lock Loop) and frequency divider may be used to change the period.

The register 230 holds the clock signal value VAL and outputs it to the pipeline register 310 and other components as the clock signal CLK in synchronism with the reference clock signal bCLK. Even if a delay time occurs when the clock generation circuit 210 generates the clock signal value VAL, the timing at which the value of the clock signal CLK makes a transition is adjusted by the operation of the register 230.

FIG. 8 is a table illustrating an example of operation of the clock generation circuit 210 according to the first embodiment. When supplied with the reset signal RST, the same circuit 210 outputs the value "0" as the clock signal value VAL and the counter reset signal cRST. When not supplied with the reset signal RST, the clock generation circuit 210 compares the count value cCNT against the positive edge timing tR, negative edge timing tF and clock period pCK. If, as a result of comparison, the count value cCNT is smaller than the positive edge timing tR, the same circuit 210 outputs the value "0" as the clock signal value VAL. If the count value cCNT is equal to or larger than the positive edge timing tR and smaller than the negative edge timing tF, the same circuit 210 outputs the value "1" as the clock signal value VAL. If the count value cCNT is equal to or larger than the negative edge timing tF, the same circuit 210 outputs the value "0" as the clock signal value VAL. If the count value cCNT matches the clock period pCK, the same circuit 210 outputs the counter reset signal cRST.

[Example of Operation of the Clock Generation Section]

Figure 9:
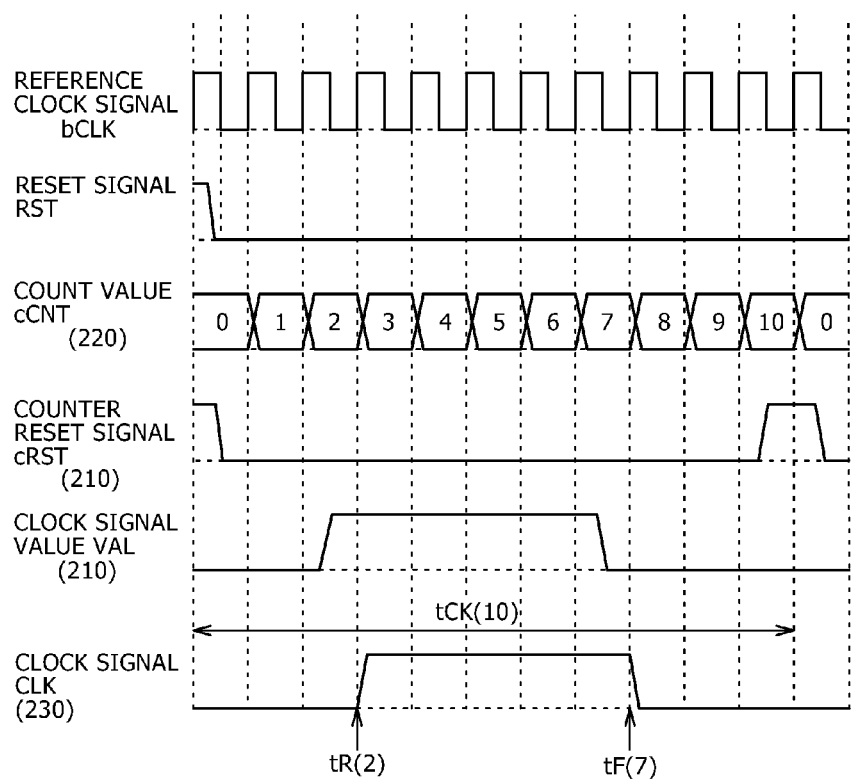
FIG. 9 is a timing diagram illustrating an operation of the clock generation section according to the first embodiment.

FIG. 9 is a timing diagram illustrating the operation of the clock generation section 200 according to the first embodiment. When not supplied with the reset signal RST, the elapsed time counter 220 increments the count value cCNT in synchronism with the reference clock signal bCLK.

The clock generation circuit 210 outputs the value "1" as the clock signal value VAL if the count value cCNT is equal to or larger than the positive edge timing tR and smaller than the negative edge timing tF. We consider, for example, a case in which the positive edge timing tR is set to "2," and the negative edge timing tF to "7." In this case, the clock signal value VAL is set to "1" when the count value cCNT becomes "2," and the clock signal value VAL is set to "0" when the count value cCNT becomes "7."

The register 230 holds the clock signal value VAL and outputs it as the clock signal CLK in synchronism with the reference clock signal bCLK.

If the count value cCNT is equal to the clock period pCK (e.g., "10"), the clock generation circuit 210 outputs the counter reset signal cRST to the elapsed time counter 220. When supplied with the counter reset signal cRST, the same counter 220 resets the count value to its initial value (e.g., "0").

[Example of Operation of the Information Processor]

Figure 10:
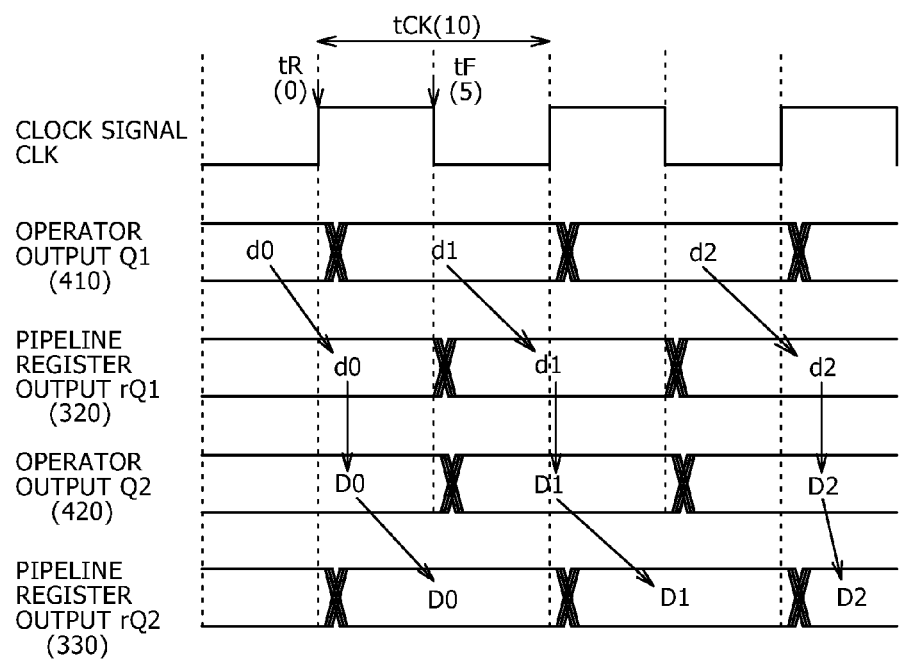
FIG. 10 is a timing diagram illustrating an operation of the information processor according to the first embodiment when no error is detected.

FIG. 10 is a timing diagram illustrating the operation of the information processor according to the first embodiment when no error is detected. If both the total PN error count and total NP error count are equal to or smaller than the threshold, the clock control section 630 controls, for example, the positive edge timing tR to "0," the negative edge timing tF to "5," and the clock period pCK to "10."

The operator 410 performs a predetermined operation on the signal supplied in synchronism with a positive edge of the clock signal CLK and outputs a data signal Q1 as the execution result. The pipeline register 320 holds the data signal Q1 and outputs it as a data signal rQ1 in synchronism with a negative edge of the clock signal CLK.

The operator 420 performs a predetermined operation on the data signal rQ1 supplied from the pipeline register 320 and outputs a data signal Q2 as the execution result. The pipeline register 330 holds the data signal Q2 and outputs it as a data signal rQ2 in synchronism with a positive edge of the clock signal CLK.

The output of the data signal Q2 is delayed relative to the data signal rQ1 from the pipeline register 320 by the amount of time it takes the operator 420 to perform the operation. However, the pipeline register 330 holds the data signal Q2 from the operator 420 at a timing (tR) different from the timing (tF) at which the data signal rQ1 is output to the operator 420, thus allowing for reliable passage of the data signal.

Figure 11:
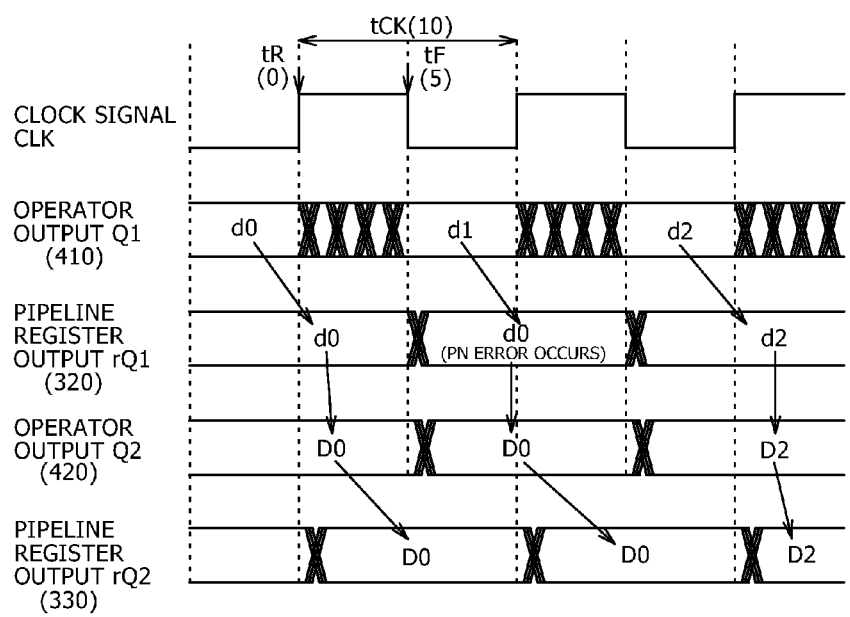
FIG. 11 is a timing diagram illustrating the operation of the information processor according to the first embodiment when a PN error is detected.

FIG. 11 is a timing diagram illustrating the operation of the information processor according to the first embodiment when a PN error is detected. We consider a case in which the operation time of the operator 410 is prolonged due, for example, to voltage drop. If the output of the data signal Q1 from the operator 410 is significantly delayed, the grace period lasting until the data signal Q1 is held by the pipeline register 320 may not meet the setup time of the pipeline register 320. This results in the output data signal Q1 being different from the held data signal rQ1, thus causing a PN error to be detected.

Figure 12:
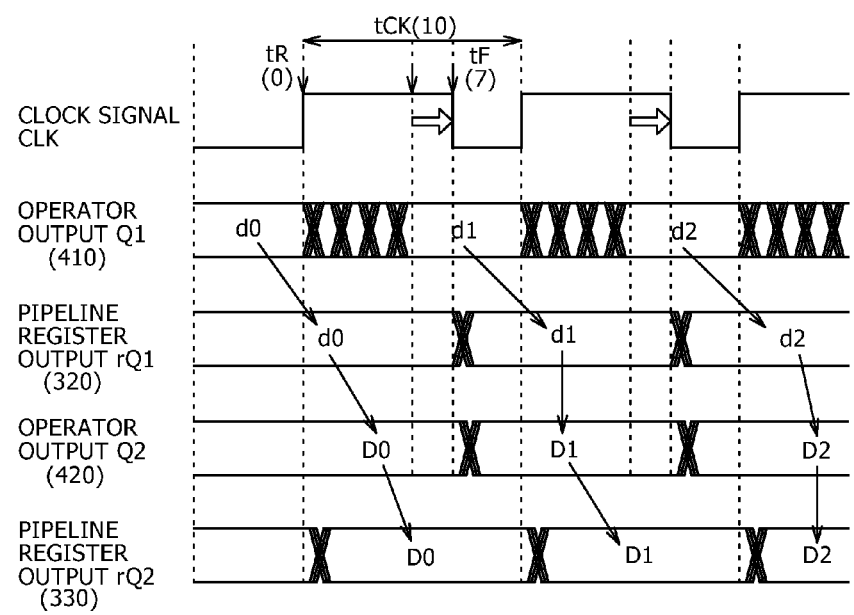
FIG. 12 is a timing diagram illustrating the operation of the information processor according to the first embodiment when PN errors are reduced.

FIG. 12 is a timing diagram illustrating the operation of the information processor according to the first embodiment when PN errors are reduced. If the total PN error count is equal to or larger than the threshold, the clock control section 630 delays the negative edge timing tF. As a result, the grace period lasting until the data signal Q1 is held in synchronism with the negative edge timing tF is prolonged, thus ensuring that the grace period meets the setup time. This provides reduced frequency of occurrence of a PN error.

Figure 13:
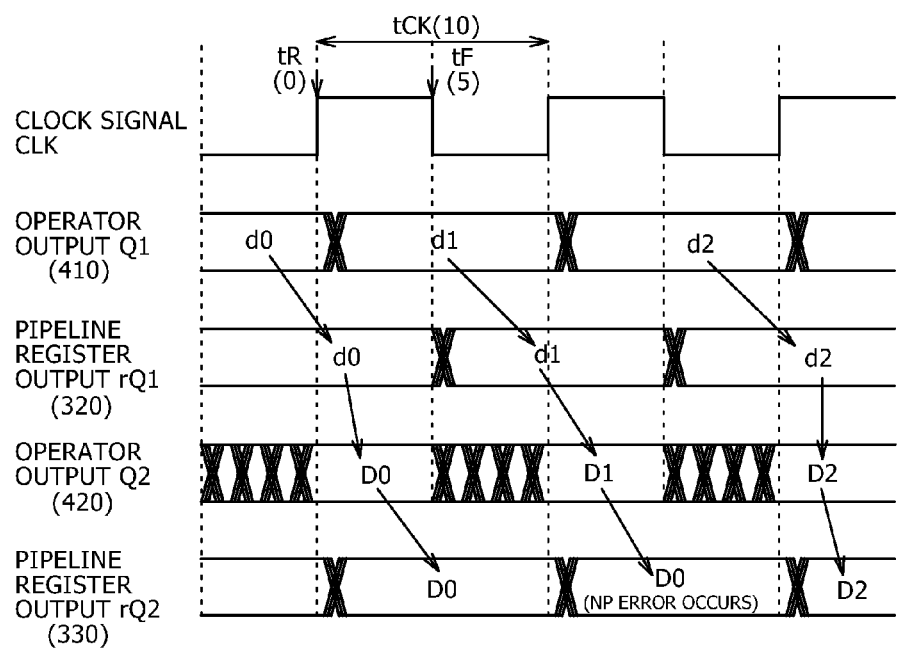
FIG. 13 is a timing diagram illustrating the operation of the information processor according to the first embodiment when an NP error is detected.

FIG. 13 is a timing diagram illustrating the operation of the information processor according to the first embodiment when an NP error is detected. We consider a case in which the operation time of the operator 420 is prolonged due, for example, to voltage drop. If the output of the data signal Q2 from the operator 420 is significantly delayed, the grace period lasting until the data signal Q2 is held by the pipeline register 330 may not meet the setup time of the pipeline register 330. This results in the output data signal Q2 being different from the held data signal rQ2, thus causing an NP error to be detected.

Figure 14:
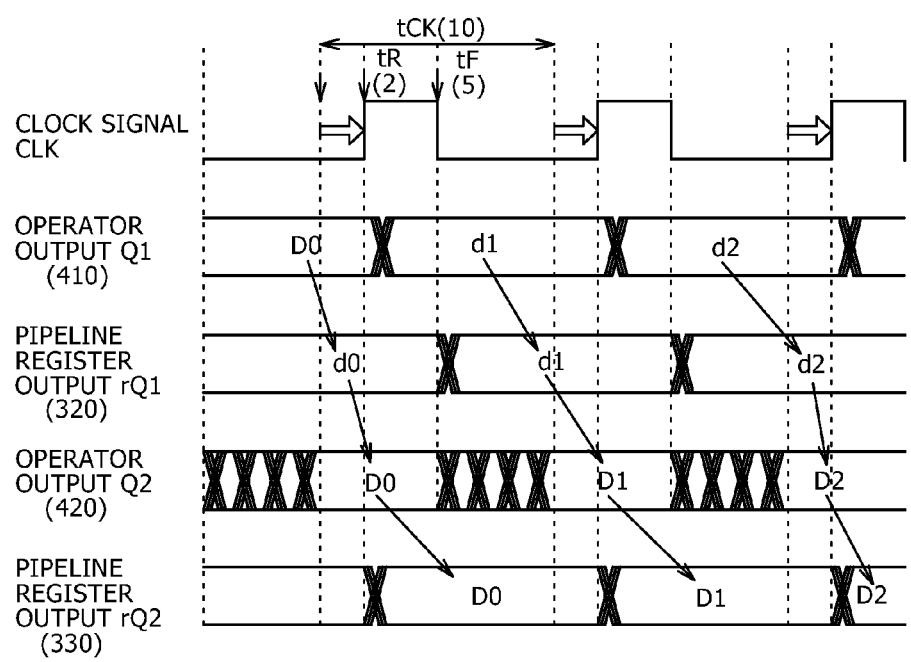
FIG. 14 is a timing diagram illustrating the operation of the information processor according to the first embodiment when NP errors are reduced.

FIG. 14 is a timing diagram illustrating the operation of the information processor according to the first embodiment when NP errors are reduced. If the total NP error count is equal to or larger than the threshold, the clock control section 630 delays the positive edge timing tR. As a result, the grace period lasting until the data signal Q2 is held in synchronism with the positive edge timing tR is prolonged, thus ensuring that the grace period meets the setup time. This provides reduced frequency of occurrence of an NP error.

Figure 15:
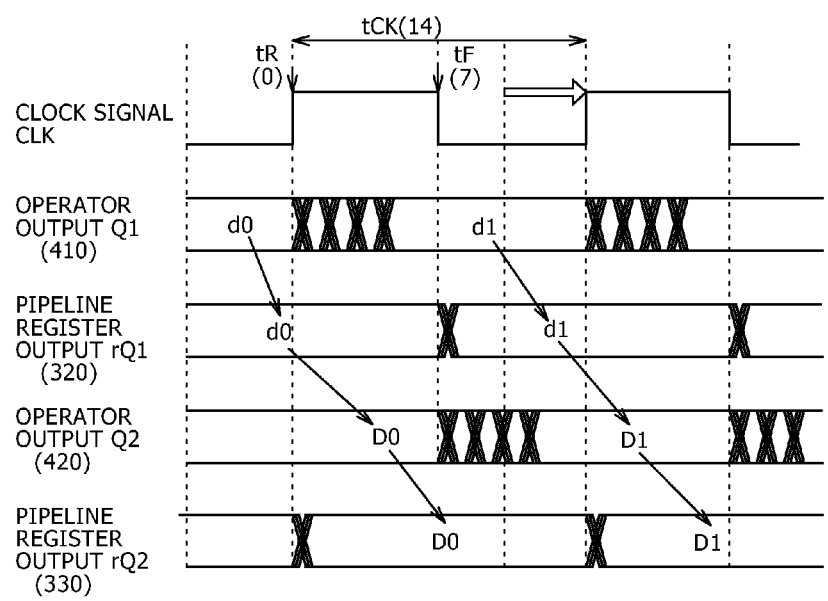
FIG. 15 is a timing diagram illustrating the operation of the information processor according to the first embodiment when PN and NP errors are reduced.

FIG. 15 is a timing diagram illustrating the operation of the information processor according to the first embodiment when PN and NP errors are reduced. If both the total PN error count and total NP error count are equal to or larger than the threshold, the clock control section 630 prolongs the clock period pCK. As a result, the grace period lasting until the data signal Q1 is held in synchronism with the negative edge timing tF is prolonged, thus providing reduced frequency of occurrence of a PN error. Further, the grace period lasting until the data signal Q2 is held in synchronism with the positive edge timing tR is prolonged, thus providing reduced frequency of occurrence of an NP error.

[Example of Operation of the Clock Control Section]

Figure 16:
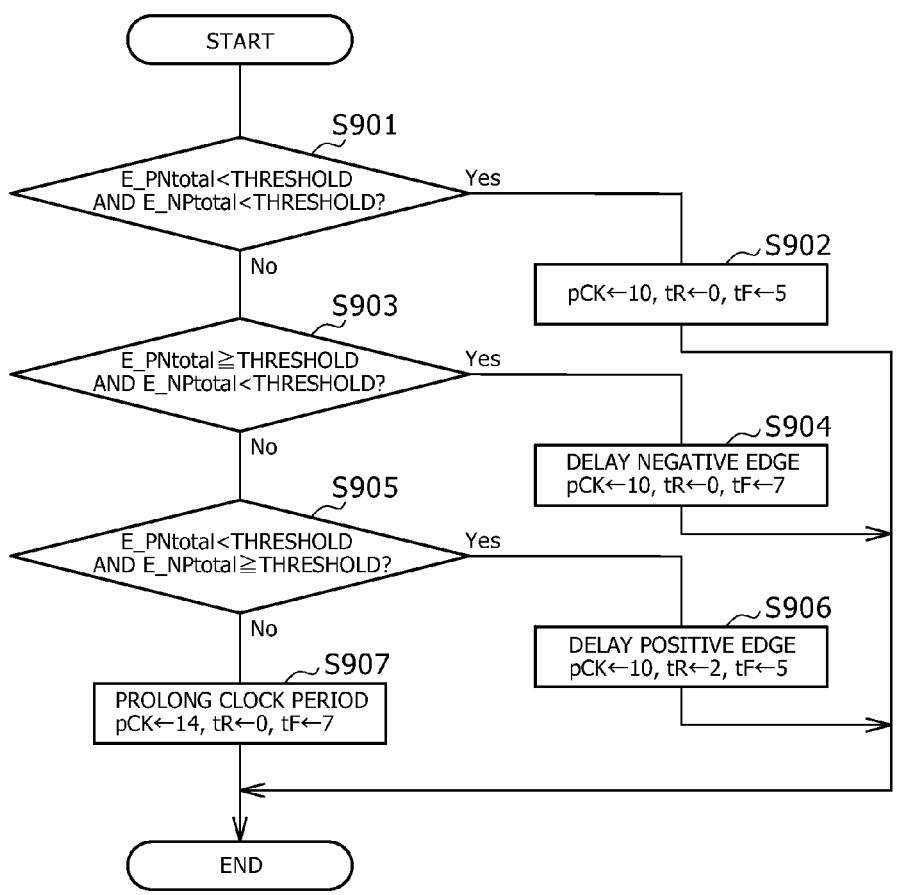
FIG. 16 is a flowchart illustrating an example of operation of the clock control section according to the first embodiment.

FIG. 16 is a flowchart illustrating an example of operation of the clock control section 630 according to the first embodiment. This operation begins when a slice start flag is supplied to the clock control section 630. The same section 630 determines whether both the total PN error count $E\_PN_{total}$ and total NP error count $E\_PN_{total}$ are smaller than the threshold (step S901). If both the total PN error count $E\_PN_{total}$ and total NP error count $E\_PN_{total}$ are smaller than the threshold (Yes in step S901), the clock control section 630 controls the clock period and edge timings to their initial values (step S902). The initial value of the clock period pCK is, for example, "10," and those of the positive edge timing tR and negative edge timing tF are, for example, "0" and "5," respectively.

If either the total PN error count $E\_PN_{total}$ or total NP error count $E\_NP_{total}$ is equal to or larger than the threshold (No in step S901), the clock control section 630 determines whether $E\_PN_{total}$ is equal to or larger than the threshold and $E\_NP_{total}$ is smaller than the threshold (step S903). If $E\_PN_{total}$ is equal to or larger than the threshold and $E\_NP_{total}$ is smaller than the threshold (Yes in step S903), the clock control section 630 delays the negative edge timing tF. For example, the same section 630 controls the positive edge timing tR to "0" and the negative edge timing tF to "7" (step S904).

We consider a case in which the condition that $E\_PN_{total}$ is equal to or larger than the threshold and $E\_NP_{total}$ is smaller than the threshold is not satisfied. In this case (No in step S903), the clock control section 630 determines whether $E\_PN_{total}$ is smaller than the threshold and $E\_PN_{total}$ is equal to or larger than the threshold (step S905). If $E\_PN_{total}$ is smaller than the threshold and $E\_PN_{total}$ is equal to or larger than the threshold (Yes in step S905), the clock control section 630 delays the positive edge timing tR. For example, the clock control section 630 controls the positive edge timing tR to "2" and the negative edge timing tF to "5" (step S906).

If both the total PN error count $E\_PN_{total}$ and total NP error count $E\_PN_{total}$ are equal to or larger than the threshold (No in step S905), the clock control section 630 prolongs the clock period pCK. For example, the same section 630 changes the clock period pCK to "14." Further, the clock control section 630 controls the edge timings in such a manner as to maintain the duty ratio constant. For example, the same section 630 controls the positive edge timing tR to "0" and the negative edge timing tF to "7" (step S907). The clock control section 630 terminates the operation adapted to control the clock signal CLK following each of steps S902, S904, S906 and S907.

As described above, according to the first embodiment of the present technology, the clock signal is controlled in such a manner that the grace period lasting until the execution result is held meets the setup time, thus ensuring that the grace period meets the setup time. This ensures that the execution result is reliably held, for example, by the pipeline register 310, thus minimizing the occurrences of timing errors.

2. Second Embodiment

Configuration Example of the Master Processor

Figure 17:
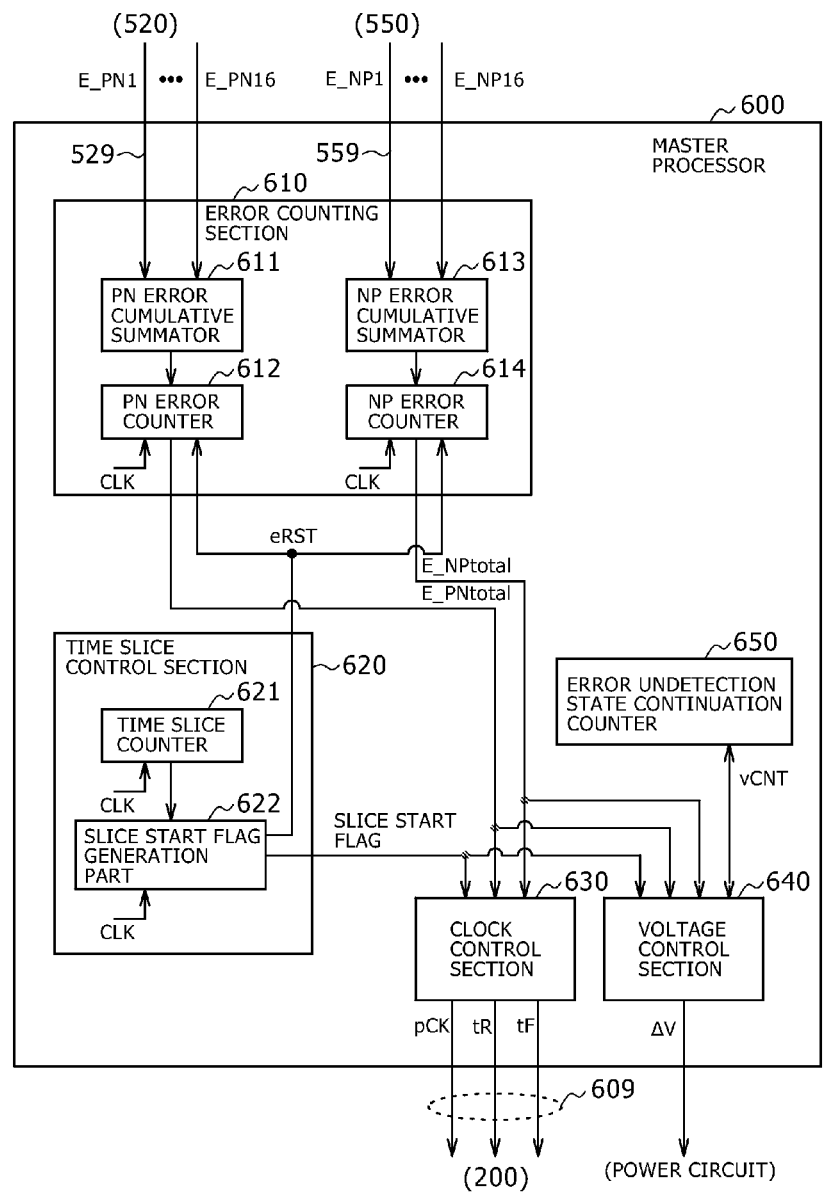
FIG. 17 is a block diagram illustrating a configuration example of the master processor according to a second embodiment.

FIG. 17 is a block diagram illustrating a configuration example of the master processor 600 according to a second embodiment. The master processor 600 according to the second embodiment differs from the counterpart according to the first embodiment in that it controls not only the clock signal but also the voltage. The same processor 600 according to the second embodiment further includes a voltage control section 640 and error undetection state continuation counter 650.

The voltage control section 640 controls the voltage supplied to the information processor 100 based on the error detection frequency. The same section 640 is supplied with a slice start flag, the total PN error count and total NP error count, and a count value vCNT of the error undetection state continuation counter 650.

The voltage control section 640 refers to the total PN error count or total NP error count when supplied with a slice start flag. If either the total PN error count or total NP error count is equal to or larger than the threshold, the same section 640 outputs a voltage control amount ΔV adapted to increase the voltage by a predetermined level to a power circuit adapted to supply power to the information processor 100.

If both the total NP error count and total PN error count are smaller than the threshold, the voltage control section 640 determines whether the count value vCNT has reached a set period (e.g., integer equal to or larger than 1). If the count value vCNT is smaller than the set period, the same section 640 controls the error undetection state continuation counter 650 to increment the count value vCNT. When the count value vCNT has reached the set period, the voltage control section 640 outputs the voltage control amount ΔV adapted to increase the voltage by a predetermined level to the power circuit and sets the count value vCNT to its initial value (e.g., "0").

The power circuit supplies power to the information processor 100 and increases or reduces the supplied voltage according to the voltage control amount ΔV.

In general, the lower the supplied power, the longer the time it takes the operator 410 and other circuitry to perform their operations, and conversely, the higher the supplied power, the shorter the time it takes these circuits to perform their operations. Therefore, the execution time can be reduced by increasing the voltage when one of the error counts is equal to or larger than the threshold, thus contributing to reduced frequency of occurrence of timing errors. The power consumption can be reduced by reducing the voltage when a period of time during which the error counts per time slice remain smaller than the threshold lasts longer than a predetermined period of time.

It should be noted that the voltage control section 640 may output a control amount when supplied with a slice start flag as does the clock control section 630. However, the same section 640 may alternatively output a control amount at a timing different from that of the clock control section 630.

FIG. 18 is a table illustrating an example of operation of the voltage control section 640 according to the second embodiment. The same section 640 refers to the total PN error count or total NP error count when supplied with a slice start flag.

If both the total NP error count and total PN error count are smaller than the threshold, the voltage control section 640 determines whether the count value vCNT has reached the set period. If the count value vCNT is smaller than the set period, the same section 640 increments the count value vCNT. When the count value vCNT has reached the set period, the voltage control section 640 outputs the voltage control amount ΔV containing a setting to reduce the voltage and sets the count value vCNT to its initial value (e.g., "0").

If either the total PN error count or total NP error count is equal to or larger than the threshold, the same section 640 outputs the voltage control amount ΔV containing a setting to increase the voltage and sets the count value vCNT to its initial value.

It should be noted that although the threshold compared against the total error counts to control the voltage is the same as that used to control the clock signal, different values may be used as the two thresholds. Further, although the setting to increase the voltage is the same irrespective of the error type, the voltage control section 640 may use different settings to increase the voltage according to the error type. For example, the setting to increase the voltage used when both the total NP error count and total PN error count are equal to or larger than the threshold may be larger than that used when either the total NP error count or total PN error count is equal to or larger than the threshold. The reason for this is that the condition in which both NP and PN errors are detected is probably more serious that the condition in which only either of the two errors is detected.

As described above, in the second embodiment according to the present technology, the master processor 600 increases the voltage supplied to the information processor 100 if an error is detected, thus ensuring that a higher voltage is supplied in the event of an error. This provides a shorter execution time of the operator 410 and other circuitry, thus contributing to reduced frequency of occurrence of errors.

3. Third Embodiment

Configuration Example of the Information Processor

FIG. 19 is a block diagram illustrating a configuration example of the information processor 100 according to a third embodiment. The information processor 100 according to the third embodiment differs from the counterpart according to the first embodiment in that it delays the operation result and determines whether the period lasting until the delayed signal is held meets the setup time.

The parity generation section 510 according to the third embodiment generates first and second parity bits from the data signal Q1. Here, the first parity bits are generated from the data signal Q1 and delayed relative to the same signal Q1. The second parity bit is generated from the first parity bits and used to detect an error in the first parity bits. The parity generation section 510 outputs the first and second parity bits to the pipeline register 320 respectively via signal lines 518 and 519.

The parity check section 520 according to the third embodiment detects a parity error in the data signal rQ1 using the first parity bits and outputs the detection result to the master processor 600 as system error information E_SYS1-1. Further, the same section 520 detects a parity error in the first parity bits using the second parity bit and outputs the detection result to the master processor 600 as PN error information E_PN1. We assume that the parity check sections 520 adapted to output E_PN1 to E_PN16 output system error information E_SYS1-1 to E_SYS1-16, and that the parity check sections 550 adapted to output E_NP1 to E_NP16 output system error information E_SYS2-1 to E_SYS2-16.

The PN error detected by the second parity bit is done so if the grace period lasting until the first parity bits delayed relative to the data signal Q1 are held does not meet the setup time. The grace period lasting until the delayed first parity bits are held is shorter than that until the undelayed data signal Q1 is held. Therefore, using the second parity bit allows reliable detection of a PN error. The same holds true for an NP error.

The master processor 600 according to the third embodiment controls the clock period and edge timings based on the frequencies of detection of PN and NP errors as does the counterpart according to the first embodiment. Further, the same processor 600 outputs the reset signal RST to the clock generation section 200 in the event of detection of a system error.

[Configuration Example of the Parity Generation Section]

Figure 20:
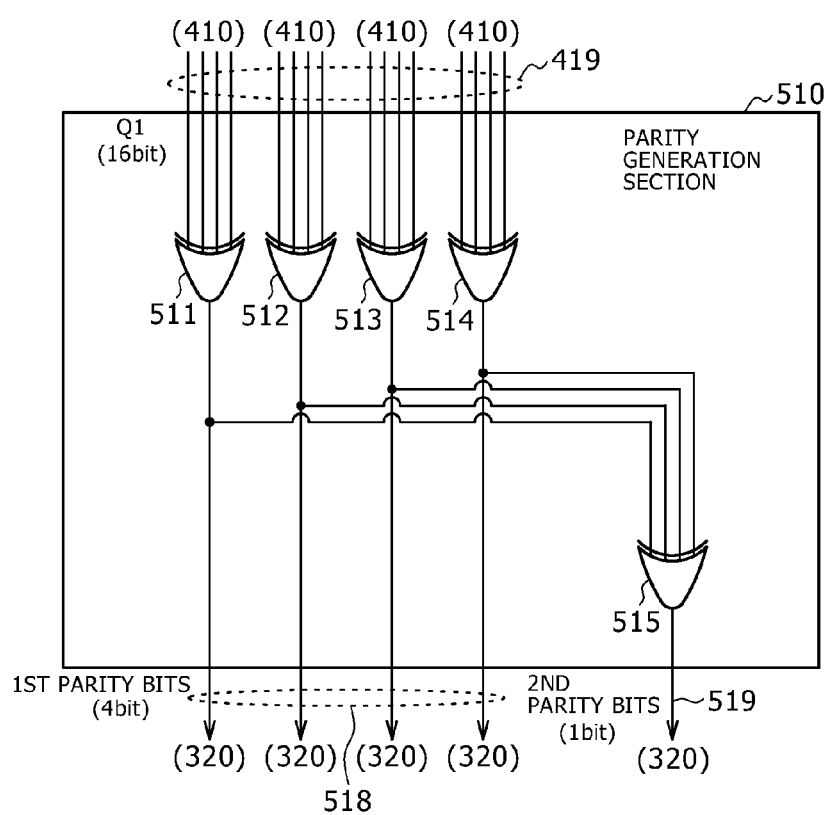
FIG. 20 is a block diagram illustrating a configuration example of the parity generation section according to the third embodiment.

FIG. 20 is a block diagram illustrating a configuration example of the parity generation section 510 according to the third embodiment. The parity generation section 510 according to the third embodiment differs from the counterpart according to the first embodiment in that it further includes an XOR gate 515.

Each of the XOR gates 511 to 514 outputs the exclusive logical sum of the input bit string to the pipeline register 320 and the XOR gate 515 as one of the first parity bits. It should be noted that each of the XOR gates 511 to 514 is an example of the delay section as defined in the appended claims.

The XOR gate 515 outputs the exclusive logical sum of the input values. The same gate 515 outputs the exclusive logical sum of the first parity bits from the XOR gates 511 to 514 to the pipeline register 320 as the second parity bit.

It should be noted that although the parity generation section 510 delays a data signal by using the XOR gates, elements or circuitry other than the XOR gates may be used so long as the data signal can be delayed. For example, the 4-input XOR gates 511 to 514 may be replaced with 16 buffers so that the output thereof is supplied to the XOR gate 515.

[Configuration Example of the Parity Check Section]

Figure 21:
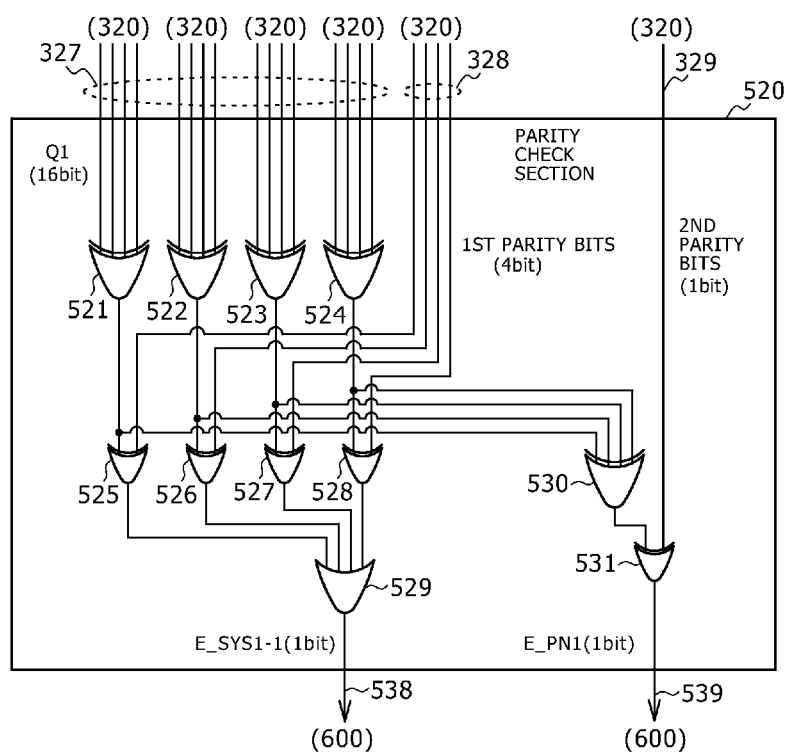
FIG. 21 is a block diagram illustrating a configuration example of the parity check section according to the third embodiment.

FIG. 21 is a block diagram illustrating a configuration example of the parity check section 520 according to the third embodiment. The parity check section 520 according to the third embodiment differs from the counterpart according to the first embodiment in that it further includes XOR gates 530 and 531.

The XOR gates 521 to 524 output the exclusive logical sums of the input bit strings to the XOR gate 530 and, respectively, to the XOR gates 525 to 528 as the first parity bits. The XOR gates 525 to 528 output the exclusive logical sums of the first parity bits respectively from the XOR gates 521 to 524 and the first parity bits from the pipeline register 320 to the OR gate 529 as error information. The OR gate 529 outputs the logical sum of the pieces of error information from the XOR gates 525 to 528 to the master processor 600 as the system error information E_SYS1-1.

Each of the XOR gates 530 and 531 outputs the exclusive logical sum of the input values. The XOR gate 530 outputs the exclusive logical sum of the first parity bits from the XOR gates 521 to 524 to the XOR gate 531 as the second parity bit. The XOR gate 531 outputs the exclusive logical sum of the second parity bit from the XOR gate 530 and the second parity bit from the pipeline register 320 to the master processor 600 as the PN error information E_PN1.

[Configuration Example of the Master Processor]

Figure 22:
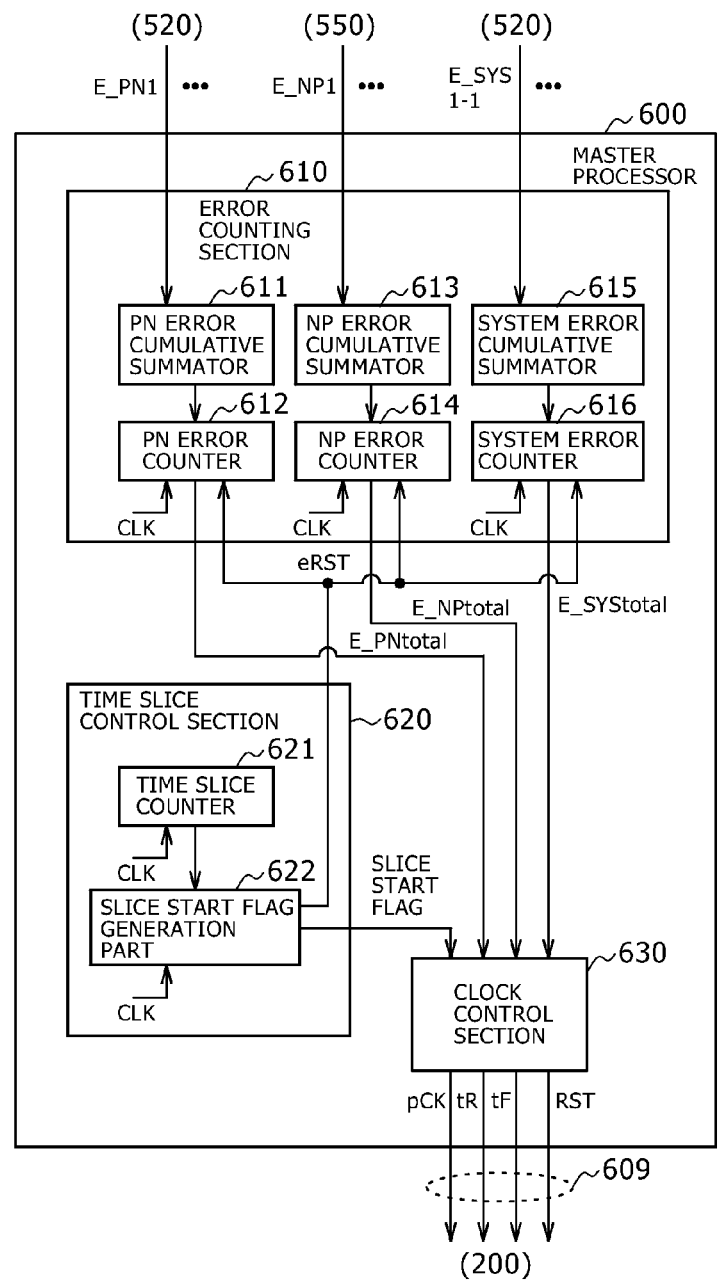
FIG. 22 is a block diagram illustrating a configuration example of the master processor according to the third embodiment.

FIG. 22 is a block diagram illustrating a configuration example of the master processor 600 according to the third embodiment. The master processor 600 according to the third embodiment differs from the counterpart according to the first embodiment in that the error counting section 610 further includes a system error cumulative summator 615 and system error counter 616.

The system error cumulative summator 615 calculates the total sum of system errors detected within a clock period. The same summator 615 is supplied with a 32-bit bit string made up of the system error information E_SYS1-1 to E_SYS1-16 and E_SYS2-1 to E_SYS2-16. The system error cumulative summator 615 calculates the number of bits which are "1" in the bit string and outputs the number to the system error counter 616.

The system error counter 616 calculates the number of system errors detected within a time slice. The same counter 616 adds the total sum from the system error cumulative summator 615 to the count value in synchronism with the clock signal CLK. The system error counter 616 outputs the count value to the clock control section 630 as a total system error count $E\_SYS_{total}$. Further, the same counter 616 resets the count value to its initial value (e.g., "0") when supplied with the error count reset signal eRST.

If the total system error count $E\_SYS_{total}$ is equal to or larger than the threshold, the clock control section 630 outputs the reset signal RST to the clock generation section 200. If the total system error count $E\_SYS_{total}$ is smaller than the threshold, the same section 630 controls the clock signal in the same manner as in the first embodiment. It should be noted that the threshold compared against the total system error count may be different from that compared against the total PN and NP error counts.

It should be noted that although the clock control section 630 stops the output of the clock signal CLK to all the elements and circuits by using the reset signal in the event of detection of a system error, the same section 630 may stop, in the event of detection of a system error, the output of the same signal CLK only to the element or section from which the error has been detected. For example, if a system error is detected only in the pipeline registers adapted to operate in synchronism with a positive edge of the clock signal CLK, it is only necessary for the clock control section 630 to stop the output of the same signal CLK only to these pipeline registers.

Further, although the clock control section 630 stops the output of the clock signal CLK in the event of detection of a system error, the same section 630 may instead perform at least one of two control tasks, namely, one adapted to prolong the clock period, and another adapted to increase the source voltage. In this case, it is only necessary to set the clock period longer in the event of detection of a system error than in the event of detection of a PN or NP error. Further, it is only necessary to set the voltage control amount larger in the event of detection of a system error than in the event of detection of a PN or NP error. The reason for this is that a more serious timing error has probably occurred if a system error is detected than if a PN or NP error is detected.

FIG. 23 is a table illustrating an example of operation of the clock control section 630 according to the third embodiment. If the total system error count $E\_SYS_{total}$ is equal to or larger than the threshold, the same section 630 outputs the reset signal RST. If the total system error count $E\_SYS_{total}$ is smaller than the threshold, the same section 630 exercises control in the same manner as in the first embodiment.

As described above, according to the third embodiment of the present technology, the clock signal is controlled in such a manner that the grace period lasting until the delayed execution result is held meets the setup time, thus ensuring that even a relatively short grace period meets the setup time. This provides higher error detection accuracy than if the execution result is not delayed, further minimizing the occurrences of errors.

It should be noted that the above embodiments are merely examples of implementing the present technology. There are correspondences between the features of the embodiments of the present technology and the specific features of the technology set forth in the appended claims. Similarly, there are correspondences between the specific features of the technology set forth in the appended claims and the identically named features of the embodiments of the present technology. It should be noted, however, that the present technology is not limited to the embodiments but may be implemented by modifying the embodiments in various manners without departing from the scope of the present technology.

The process steps described in the above embodiments may be interpreted as a method having a series of steps, a program adapted to cause a computer to perform the series of steps or a storage media storing the program. Among the types of storage media that can be used are a CD (Compact Disc), MD (MiniDisc), DVD (Digital Versatile Disk), memory card and Blu-ray Disc (registered trademark).

It should be noted that the present technology may have the following configurations.

(1) An information processor including:

a processing section adapted to perform a predetermined process on a data signal output in synchronism with one of positive and negative edges of a clock signal and output an execution result thereof;

a holding section adapted to hold the execution result in synchronism with the other of the positive and negative edges;

a timing determination section adapted to determine whether a grace period lasting until the execution result is held by the holding section meets a setup time of the holding section;

a clock control section adapted to control at least the timing of either the positive or negative edge in such a manner that the grace period meets the setup time if it is determined that the grace period does not meet the setup time; and a clock generation section adapted to generate the clock signal according to the controlled timing.

(2) The information processor of feature 1, in which the timing determination section determines whether each of two grace periods, namely, a negative edge grace period which is a grace period lasting until the execution result related to the data signal output in synchronism with the positive edge is held by the holding section in synchronism with the negative edge, and a positive edge grace period which is a grace period lasting until the execution result related to the data signal output in synchronism with the negative edge is held by the holding section in synchronism with the positive edge, meets the setup time, and the clock control section includes a timing control section adapted to control the timing of at least the positive or negative edge in such a manner that both the negative and positive edge grace periods meet the setup time if it is determined that the negative or positive edge grace period does not meet the setup time, and a clock period control section adapted to prolong the period of the clock signal in such a manner that both the negative and positive edge grace periods meet the setup time if it is determined that both the negative and positive edge grace periods do not meet the setup time.

(3) The information processor of feature 1 or 2, in which the clock control section performs at least one of two control tasks until the grace period meets the setup time, namely, one adapted to hasten one of the timings, and another adapted to delay the other timing.

(4) The information processor of any one of features 1 to 3 further including:

a delay section adapted to delay the execution result output from the processing section before outputting the same result to the holding section, in which the timing determination section treats the period lasting until the execution result delayed by the delay section is held by the holding section as the grace period and determines whether the grace period meets the setup time of the holding section.

(5) The information processor of feature 4 still further including:

an error code generation section adapted to generate an error detection code used to detect an error in the execution result delayed by the delay section, in which the timing determination section determines that the grace period does not meet the setup time if an error of the delayed execution result is detected by using the error detection code.

(6) The information processor of any one of features 1 to 5, in which the processing section still further includes a voltage control section adapted to perform the predetermined process on the data signal in an execution time commensurate with a voltage supplied from a power supply section and cause the power supply section to supply a voltage increased by a predetermined level if it is determined that the grace period does not meet the setup time.

(7) A control method of an information processor, the control method including:

performing a predetermined process on a data signal output in synchronism with one of positive and negative edges of a clock signal and outputting an execution result thereof;

holding the execution result in synchronism with the other of the positive and negative edges;

determining whether a grace period lasting until the execution result is held by a holding section meets a setup time of the holding section;

controlling at least the timing of either the positive or negative edge in such a manner that the grace period meets the setup time if it is determined that the grace period does not meet the setup time; and generating the clock signal according to the controlled timing.

The present disclosure contains subject matter related to that disclosed in Japanese Priority Patent Application JP 2012-006979 filed in the Japan Patent Office on Jan. 17, 2012, the entire content of which is hereby incorporated by reference.

What is claimed is:

1. An information processor comprising:
a processing section adapted to perform a predetermined process on a data signal output in synchronism with one of positive and negative edges of a clock signal and output an execution result thereof;
a holding section adapted to hold the execution result in synchronism with the other of the positive and negative edges;
a timing determination section adapted to determine whether a grace period lasting until the execution result is held by the holding section meets a setup time of the holding section;
a clock control section adapted to control at least the timing of either the positive or negative edge in such a manner that the grace period meets the setup time if it is determined that the grace period does not meet the setup time; and
a clock generation section adapted to generate the clock signal according to the controlled timing.

2. The information processor of claim 1, wherein
the timing determination section determines whether a negative edge grace period and a positive edge grace period meet the setup time, the negative edge grace period being a grace period lasting until the execution result related to the data signal output in synchronism with the positive edge is held by the holding section in synchronism with the negative edge, and the positive edge grace period being a grace period lasting until the execution result related to the data signal output in synchronism with the negative edge is held by the holding section in synchronism with the positive edge, and
the clock control section includes
a timing control section adapted to control the timing of at least the positive or negative edge in such a manner that both the negative and positive edge grace periods meet the setup time if it is determined that the negative or positive edge grace period does not meet the setup time, and
a clock period control section adapted to prolong the period of the clock signal in such a manner that both the negative and positive edge grace periods meet the setup time if it is determined that both the negative and positive edge grace periods do not meet the setup time.

3. The information processor of claim 1, wherein
the clock control section performs at least one of two control tasks until the grace period meets the setup time, the first control task being configured to hasten one of the timings, and the second control task being configured to delay the other timing.

4. The information processor of claim 1 further comprising:
a delay section adapted to delay the execution result output from the processing section before outputting the execution result to the holding section, wherein
the timing determination section treats the period for which the execution result delayed by the delay section is held by the holding section as the grace period and determines whether the grace period meets the setup time of the holding section.

5. The information processor of claim 4 still further comprising:
an error code generation section adapted to generate an error detection code used to detect an error in the execution result delayed by the delay section, wherein
the timing determination section determines that the grace period does not meet the setup time if an error of the delayed execution result is detected by using the error detection code.

6. The information processor of claim 1, wherein
the processing section further includes a voltage control section adapted to perform the predetermined process on the data signal in an execution time commensurate with a voltage supplied from a power supply section and cause the power supply section to supply a voltage increased by a predetermined level if it is determined that the grace period does not meet the setup time.

7. A control method of an information processor, the control method comprising:
- performing, by at least one processing unit, a predetermined process on a data signal output in synchronism with one of positive and negative edges of a clock signal and outputting an execution result thereof;
- holding, by said at least one processing unit, the execution result in synchronism with the other of the positive and negative edges;
- determining, by said at least one processing unit, whether a grace period lasting until the execution result is held by a holding section meets a setup time of the holding section;
- controlling, by said at least one processing unit, at least the timing of either the positive or negative edge in such a manner that the grace period meets the setup time if it is determined that the grace period does not meet the setup time; and
- generating, by said at least one processing unit, the clock signal according to the controlled timing.

8. The method of claim 7, wherein
said determining whether the grace period meets the setup time further comprises determining whether a negative edge grace period and a positive edge grace period meet the setup time, the negative edge grace period being a grace period lasting until the execution result related to the data signal output in synchronism with the positive edge is held by the holding section in synchronism with the negative edge, and the positive edge grace period being a grace period lasting until the execution result related to the data signal output in synchronism with the negative edge is held by the holding section in synchronism with the positive edge, and
said controlling at least the timing of either the positive or negative edge includes
controlling the timing of at least the positive or negative edge in such a manner that both the negative and positive edge grace periods meet the setup time if it is determined that the negative or positive edge grace period does not meet the setup time, and
prolonging the period of the clock signal in such a manner that both the negative and positive edge grace periods meet the setup time if it is determined that both the negative and positive edge grace periods do not meet the setup time.

9. The method of claim 7, wherein said controlling at least the timing of either the positive or negative edge includes at least one of two control tasks until the grace period meets the setup time, the first control task being configured to hasten one of the timings, and the second control task being configured to delay the other timing.

10. The method of claim 7, further comprising:
delaying the execution result before said holding of the execution result, wherein
said determining whether the grace period meets the setup time includes treating a period for which the execution result is delayed as the grace period and determining whether the grace period meets the setup time.

11. The method of claim 10, further comprising:
generating an error detection code used to detect an error in the execution result, and
determining that the grace period does not meet the setup time if an error of the delayed execution result is detected by using the error detection code.

12. The method of claim 7, further comprising:
performing the predetermined process on the data signal in an execution time commensurate with a voltage supplied from a power supply section and causing the power supply section to supply a voltage increased by a predetermined level if it is determined that the grace period does not meet the setup time.

* * * * *